(12) United States Patent
Orton et al.

(10) Patent No.: US 6,606,742 B1
(45) Date of Patent: *Aug. 12, 2003

(54) OBJECT-ORIENTED INTERFACE FOR PORTABILITY TO DIVERSE OPERATING SYSTEMS OR HARDWARE PLATFORMS

(75) Inventors: Debra Lyn Orton, San Jose, CA (US); Eugenie Lee Bolton, Sunnyvale, CA (US); Daniel F. Chernikoff, Palo Alto, CA (US); David Brook Goldsmith, Los Gatos, CA (US); Christopher P. Moeller, Los Altos, CA (US)

(73) Assignee: Taligent, Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/377,752

(22) Filed: Aug. 20, 1999

Related U.S. Application Data

(63) Continuation of application No. 09/251,056, filed on Feb. 18, 1999, now abandoned, which is a division of application No. 09/186,419, filed on Nov. 5, 1998, now Pat. No. 6,351,778, which is a continuation of application No. 08/521,085, filed on Aug. 29, 1995, now abandoned, which is a continuation of application No. 08/315,212, filed on Sep. 28, 1994, now Pat. No. 5,475,845, which is a continuation of application No. 08/094,675, filed on Jul. 19, 1993, now Pat. No. 5,379,432.

(51) Int. Cl.$^7$ ................................................. G06F 9/45
(52) U.S. Cl. ........................ 717/140; 717/136; 717/153
(58) Field of Search ............................ 717/6, 140, 136, 717/153

(56) References Cited

U.S. PATENT DOCUMENTS

| | | | |
|---|---|---|---|
| 4,456,954 A | 6/1984 | Bullions, III et al. ....... | 711/207 |
| 4,493,080 A | 1/1985 | Campbell ................... | 714/755 |
| 4,530,052 A | 7/1985 | King et al. ................. | 713/100 |

(List continued on next page.)

OTHER PUBLICATIONS

Julin, D.P. et al., "Generalized Emulation Services for Mach 3,0—Overview, Experiences and Current Status," *USENIX Association—Mach Symposium Proceedings*, Nov. 1991, pp. 13–26.

Malan, G. et al., "DDS as a Mach 3.0 Application," *USENIX Assoc.—Mach Symposium Proceedings*, Nov. 1991, pp. 27–40.

Rashid, R., "A Catalyst for Open Systems," *Datamation*, May 15, 1988, p. 32–33.

(List continued on next page.)

*Primary Examiner*—Tuan Q. Dam
*Assistant Examiner*—John Q. Chavis
(74) *Attorney, Agent, or Firm*—Morgan & Finnegan, LLP

(57) ABSTRACT

An object-oriented interface is disclosed for conferring portability for object-oriented programming to diverse operating systems on diverse hardware platforms in a computer system. The object-oriented interface is executable on a plurality of different computer platforms and includes classes of object-oriented methods. The interface is responsive to the object-oriented programming which instantiates its objects from its own classes and invokes the object oriented methods of the interface. Operating system specific, procedural program logic is compiled for use on a given computer platform that includes given computer hardware and a given procedural operating system which is executable on the hardware. A determination is made if the object-oriented methods of the interface to be invoked during runtime execution are present in the program memory of the computer hardware. A runtime loader selectively loads into the program memory any required object-oriented methods of the interface during runtime before their invocation by the object-oriented programming. The object-oriented interface thereby provides native system services to the object-oriented programming from the given computer hardware and procedural operating system.

12 Claims, 16 Drawing Sheets

U.S. PATENT DOCUMENTS

| | | | |
|---|---|---|---|
| 4,704,694 A | 11/1987 | Czerniejewski | 382/288 |
| 4,722,048 A | 1/1988 | Hirsch et al. | 709/102 |
| 4,821,220 A | 4/1989 | Duisberg | 703/2 |
| 4,885,717 A | 12/1989 | Beck et al. | 717/4 |
| 4,891,630 A | 1/1990 | Friedman et al. | 345/156 |
| 4,926,322 A | 5/1990 | Stimac et al. | 703/23 |
| 4,953,080 A | 8/1990 | Dysart et al. | 707/103 |
| 4,974,159 A | 11/1990 | Hargrove et al. | 703/27 |
| 5,041,992 A | 8/1991 | Cunningham et al. | 345/641 |
| 5,050,090 A | 9/1991 | Golub et al. | 700/217 |
| 5,060,276 A | 10/1991 | Morris et al. | 382/151 |
| 5,063,375 A | 11/1991 | Lien et al. | 345/136 |
| 5,075,848 A | 12/1991 | Lai et al. | 711/152 |
| 5,093,914 A | 3/1992 | Coplien et al. | 717/4 |
| 5,119,475 A | 6/1992 | Smith et al. | 345/353 |
| 5,125,091 A | 6/1992 | Staas, Jr. et al. | 709/101 |
| 5,133,075 A | 7/1992 | Risch | 707/201 |
| 5,136,705 A | 8/1992 | Stubbs et al. | 714/27 |
| 5,136,711 A | 8/1992 | Huggard et al. | 713/2 |
| 5,151,987 A | 9/1992 | Abraham et al. | 714/20 |
| 5,155,558 A | 10/1992 | Tannenbaum et al. | 356/446 |
| 5,179,703 A | 1/1993 | Evans | 717/3 |
| 5,181,162 A | 1/1993 | Smith et al. | 707/530 |
| 5,237,669 A | 8/1993 | Spear et al. | 711/2 |
| 5,274,821 A | 12/1993 | Rouquie | 717/5 |
| 5,280,583 A | 1/1994 | Nakayama et al. | 709/205 |
| 5,280,610 A | 1/1994 | Travis, Jr. et al. | 707/103 |
| 5,287,507 A | 2/1994 | Hamilton et al. | 709/303 |
| 5,293,385 A | 3/1994 | Hary | 714/38 |
| 5,297,284 A | 3/1994 | Jones et al. | 717/5 |
| 5,313,636 A | 5/1994 | Noble et al. | 707/1 |
| 5,315,703 A | 5/1994 | Matheny et al. | 345/700 |
| 5,315,709 A | 5/1994 | Alston, Jr. et al. | 707/6 |
| 5,317,741 A | 5/1994 | Schwanke | 717/3 |
| 5,321,841 A | 6/1994 | East et al. | 709/107 |
| 5,325,481 A | 6/1994 | Hunt | 345/809 |
| 5,325,522 A | 6/1994 | Vaughn | 707/1 |
| 5,325,524 A | 6/1994 | Black | 707/10 |
| 5,325,533 A | 6/1994 | McInerney et al. | 717/1 |
| 5,327,562 A | 7/1994 | Adcock | 717/8 |
| 5,339,422 A | 8/1994 | Brender et al. | 717/4 |
| 5,339,430 A | 8/1994 | Lundin et al. | 709/305 |
| 5,339,438 A | 8/1994 | Conner et al. | 717/5 |
| 5,341,478 A | 8/1994 | Travis, Jr. et al. | 709/203 |
| 5,361,350 A | 11/1994 | Conner et al. | 707/103 |
| 5,361,358 A | 11/1994 | Cox et al. | 717/11 |
| 5,379,432 A * | 1/1995 | Orton et al. | 709/315 |
| 5,404,529 A | 4/1995 | Chernikoff et al. | 709/303 |
| 5,446,902 A * | 8/1995 | Islam | 717/116 |
| 5,455,951 A | 10/1995 | Bolton et al. | 709/103 |
| 5,471,568 A | 11/1995 | Webb et al. | 345/126 |
| 5,473,777 A | 12/1995 | Moeller et al. | 709/302 |
| 5,475,845 A | 12/1995 | Orton et al. | 709/302 |
| 5,519,867 A | 5/1996 | Moeller et al. | 709/107 |

OTHER PUBLICATIONS

Guedes, Paulo, "O–O Interfaces in the Mach 3.0 Multi–Server System," IEEE 1991.

Rashid, R., "Mach: A Foundation for Open Systems." Carnegie Mellon University, IEEE 1989.

Foley, M.J., "Taligent, IBM draw closer," PC Week, Feb. 21, 1994, vol. 11, No. 7, p. 8.

Franz, M., "Emulating an Operating System on Top of Another," 1993 by John Wiley & Sons. Ltd.

IBM C/C++TOOLS: 'User Interface Class Library Reference' May 1993, IBM Part No. 61G1179, DENMARK See p. 464, lines 1–11.

Petzold, Charles, "Intro to OS/2 Function Calls," PC Magazine, vol. 6, No. 18, Oct. 27, 1987, NY, US, pp. 375–380.

Breisacher, Lee, "Smalltalk/V Presentation Mgr.," OS/2 NOTEBOOK: The Best of IBM Personal Systems Developer; (Dick Conklin; General Editor), 1990, Microsoft Press, Redmond, US, pp. 226–232.

IBM C/C++TOOLS, "Programming Guide," Mar. 1993, IBM Part No. G1G1181, DENMARK, See p. 35, line 1; see p. 438, lines 1–6.

Bernabeau–Auban et al., "Clouds—A Distributed Object–Based Operating System Architecture and Kernel Implementation," New Directions for Unix Proc. Autumn 1988 EUUG Conf. Oct. 3, 1988, Cascais, Portugal, pp. 25–37.

Daponte et al., "Object–Oriented Design of Measurement Systems," Conference Record of IEEE Instrumentation and Measurement Technology Conference, May 12, 1992, New York, pp. 243–248.

Dohlberg, S, "Galaxy from Visix", Open Information Systems, vol. 7, No. 10, Oct. 1992, pp. 1–16.

Hruschka, "Towards an Object Oriented Method for System Architecture Design," Proceeding of the 1990 IEEE International Conference on Computer Systems and Software Engineering, COMPEURO '90, May 8, 1990, Tel Aviv, pp 12–17.

McCormack et al., "Using the Toolkit or How to Write a Widget," Proc. Of the Summer 1988 USENIX Conf., Jun. 20, 1988, San Francisco, pp. 1–13.

Musser, John, "Extending steambufs: class logstrubf" C++ Report. 4(3), Mar. 1992, pp. 51–55.

Schmidt, Doug, "Systems Programming with C++ Wrappers: Encapsulating IPC Services," C++ Report, 4(8), Oct. 1992. pp. 50–54.

Schmidt, Doug, "An Object–Oriented Interface to IPC Services," C++ Report, 4(9), Nov. 1992, pp. 48–54.

Schmidt, Doug, "Encapsulating Operating Systems IPCs: An Object–Oriented Interface for Event–Driven UNIX I/O Multiplexing," C++ Report, 5(2), Feb. 1993, pp. 43–50.

Adler, R.M., "A Hierarchical Distributed Control Model for Coordinating Intelligent Systems," Telmatics and Informatics, vol. 8(4), 1991, U.S., pp. 385–402.

Guerraoui et al., "Distributed Programming in GARF," Object–Based Distributed Programming EFCOOP '93 Workshop, Jul. 26. 1993, Kaiserslautern. DE pp. 225–239.

Motro et al., "The Design of KIVIEW: An Object–Oriented Browser," Proc. 2$^{nd}$ Intl. Conf. on Expert Database Systems, Apr. 25, 1988, pp. 107–131.

IBM Technical Disclosure Bulletin, "Process Element Wrapper and the Context Verb Object Method Registry," vol. 34(10A), Mar. 1992, New York, pp. 433–435.

Goodman, "Knowledge–Based Computer Vision," Computer. V.22(12), Dec. 1989, Long Beach. CA, pp. 43–54.

Drake, "Objects and Images," Computer Systems, V. 10(1), Jan. 1990, Bromley, GB, pp. 31–32.

Fiume, "Active Objects in the Construction of Graphical User Interfaces," Computers and Graphics, V. 13(3), Oxford, GB, pp. 321–327.

Foley et al., Fundamentals of Interactive Computer Graphics, (1984) pp. 431–477, 964–965.

Salisin et al., "Adjustable Tools: An Object–Oriented Interaction Metaphor," ACM Transactions on Graphics, V. 12(1), Jan. 1993, New York, NY, pp. 103–107.

Schroeder, "Visage: An Object–Oriented Scientific Visualization System," Proceedings Visualization '92, Oct. 19, 1992, Los Alamitos, CA, pp. 219–226.

* cited by examiner

OBJECT-ORIENTED INTERFACE FOR PORTABILITY TO DIVERSE OPERATING SYSTEMS OR HARDWARE PLATFORMS

CROSS-REFERENCES TO RELATED APPLICATIONS

This is a continuation application under 37 C.F.R. 1.53(b) of U.S. patent application Ser. No. 09/251,056, filed on Feb. 18, 1999 now abandoned, which is a divisional of application Ser. No. 09/186,419 now U.S. Pat. No. 6,351,778, filed Nov. 5, 1998, which is a continuation of application Ser. No. 08/521,085, filed Aug. 29, 1995, now abandoned, which is a continuation of application Ser. No. 08/315,212, filed Sep. 28, 1994, now U.S. Pat. No. 5,475,845, which is a continuation of application Ser. No. 08/094,675, filed Jul. 19, 1993, now U.S. Pat. No. 5,379,432.

A portion of the disclosure of this patent application contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to object-oriented computing environments, and more particularly to a system and method for providing an object-oriented interface for a procedural operating system.

BACKGROUND OF THE INVENTION

Object-oriented technology (OOT), which generally includes object-oriented analysis (OOA), object-oriented design (OOD), and object-oriented programming (OOP), is earning its place as one of the most important new technologies in software development. OOT has already begun to prove its ability to create significant increases m programmer productivity and in program maintainability. By engendering an environment in which data and the procedures that operate on the data are combined into packages called objects, and by adopting a rule that demands that objects communicate with one another only through well-defined messaging paths, OOT removes much of the complexity of traditional, procedure-oriented programming.

The following paragraphs present a brief overview of some of the more important aspects of OOT. More detailed discussions of OOT are available in many publicly available documents, including Object Oriented Design With Applications by Grady Booch (Benjamin/Cummings Publishing Company, 1991) and Object-Oriented Requirements Analysis and Logical Design by Donald G. Firesmith (John Wiley & Sons, Inc., 1993). The basic component of OOT is the object. An object includes, and is characterized by, a set of data (also called attributes) and a set of operations (called methods) that can operate on the data. Generally, an object's data may change only through the operation of the object's methods.

A method in an object is invoked by passing a message to the object (this process is called message passing). The message specifies a method name and an argument list. When the object receives the message, code associated with the named method is executed with the formal parameters of the method bound to the corresponding values in the argument list. Methods and message passing in OOT are analogous to procedures and procedure calls in procedure-oriented software environments. However, while procedures operate to modify and return passed parameters, methods operate to modify the internal state of the associated objects (by modifying the data contained therein). The combination of data and methods in objects is called encapsulation. Perhaps the greatest single benefit of encapsulation is the fact that the state of any object can only be changed by well-defined methods associated with that object. When the behavior of an object is confined to such well-defined locations and interfaces, changes (that is, code modifications) in the object will have minimal impact on the other objects and elements in the system. A second "fringe benefit" of good encapsulation in object-oriented design and programming is that the resulting code is more modular and maintainable than code written using more traditional techniques.

The fact that objects are encapsulated produces another important fringe benefit that is sometimes referred to as data abstraction. Abstraction is the process by which complex ideas and structures are made more understandable by the removal of detail and the generalization of their behavior. From a software perspective, abstraction is in many ways the antithesis of hard-coding. Consider a software windowing example: if every detail of every window that appears on a user's screen in a graphical user interface (GUI)-based program had to have all of its state and behavior hard-coded into a program, then both the program and the windows it contains would lose almost all of their flexibility. By abstracting the concept of a window into a window object, object-oriented systems permit the programmer to think only about the specific aspects that make a particular window unique. Behavior shared by all windows, such as the ability to be dragged and moved, can be shared by all window objects.

This leads to another basic component of OOT, which is the class. A class includes a set of data attributes plus a set of allowable operations (that is, methods) on the data attributes. Each object is an instance of some class. As a natural outgrowth of encapsulation and abstraction, OOT supports inheritance. A class (called a subclass) may be derived from another class (called a base class, a parent class, etc.) wherein the subclass inherits the data attributes and methods of the base class. The subclass may specialize the base class by adding code which overrides the data and/or methods of the base class, or which adds new data attributes and methods. Thus, inheritance represents a mechanism by which abstractions are made increasingly concrete as subclasses are created for greater levels of specialization. Inheritance is a primary contributor to the increased programmer efficiency provided by OOP. Inheritance makes it possible for developers to minimize the amount of new code they have to write to create applications. By providing a significant portion of the functionality needed for a particular task, classes in the inheritance hierarchy give the programmer a head start to program design and creation. One potential drawback to an object-oriented environment lies in the proliferation of objects that must exhibit behavior which is similar and which one would like to use as a single message name to describe. Consider, for example, an object-oriented graphical environment: if a Draw message is sent to a Rectangle object, the Rectangle object responds by drawing a shape with four sides. A Triangle object, on the other hand, responds by drawing a shape with three sides. Ideally, the object that sends the Draw message remains unaware of either the type of object to which the message is addressed or of how that object that receives the message will draw itself in response. If this ideal can be achieved, then it will be relatively simple to add a new kind of shape later (for example, a hexagon) and leave the code sending the Draw message completely unchanged.

In conventional, procedure-oriented languages, such a linguistic approach would wreak havoc. In OOT environments, the concept of polymorphism enables this to be done with impunity. As one consequence, methods can be written that generically tell other objects to do something without requiring the sending object to have any knowledge at all about the way the receiving object will understand the message. Software programs, be they object-oriented, procedure-oriented, rule based, etc., almost always interact with the operating system to access the services provided by the operating system. For example, a software program may interact with the operating system in order to access data in memory, to receive information relating to processor faults, to communicate with other processes, or to schedule the execution of a process.

Most conventional operating systems are procedure-oriented and include native procedural interfaces. Consequently, the services provided by these operating systems can only be accessed by using the procedures defined by their respective procedural interfaces. If a program needs to access a service provided by one of these procedural operating systems, then the program must include a statement to make the appropriate operating system procedure call. This is the case, whether the software program is object-oriented, procedure-oriented, rule based, etc. Thus, conventional operating systems provide procedure-oriented environments in which to develop and execute software. Some of the advantages of OOT are lost when an object-oriented program is developed and executed in a procedure-oriented environment. This is true, since all accesses to the procedural operating system must be implemented using procedure calls defined by the operating system's native procedural interface. Consequently, some of the modularity, maintainability, and reusability advantages associated with object-oriented programs are lost since it is not possible to utilize classes, objects, and other OOT features to their fullest extent possible.

One solution to this problem is to develop object-oriented operating systems having native object-oriented interfaces. While this ultimately may be the best solution, it currently is not a practical solution since the resources required to modify all of the major, procedural operating systems would be enormous. Also, such a modification of these procedural operating systems would render useless thousands of procedure-oriented software programs. Therefore, what is needed is a mechanism for enabling an object-oriented application to interact in an object-oriented manner with a procedural operating system having a native procedural interface.

SUMMARY OF THE INVENTION

The present invention is directed to a system and method of enabling an object-oriented application to access in an object-oriented manner a procedural operating system having a native procedural interface. The system includes a computer and a memory component in the computer. A code library is stored in the memory component. The code library includes computer program logic implementing an object-oriented class library. The object-oriented class library comprises related object-oriented classes for enabling the application to access in an object-oriented manner services provided by the operating system. The object-oriented classes include methods for accessing the operating system services using procedural function calls compatible with the native procedural interface of the operating system. The system also includes means for processing object-oriented statements contained in the application and defined by the class library by executing methods from the class library corresponding to the object-oriented statements.

Preferably, the class library includes:

(1) thread classes for enabling an application to access in an object-oriented manner operating system services to spawn, control, and obtain information relating to threads;

(2) task classes for enabling an application to access in an object-oriented manner operating system services to reference and control tasks, wherein the tasks each represents an execution environment for threads respectively associated with the tasks;

(3) virtual memory classes for enabling an application to access in an object-oriented manner operating system services to access and manipulate virtual memory in a computer;

(4) interprocess communication (IPC) classes for enabling an application to access in an object-oriented manner operating system services to communicate with other threads during run-time execution of the application in a computer;

(5) synchronization classes for enabling an application to access in an object-oriented manner operating system services to synchronize execution of threads;

(6) scheduling classes for enabling an application to access in an object-oriented manner operating system services to schedule execution of threads;

(7) fault classes for enabling an application to access in an object-oriented manner operating system services to process system and user-defined processor faults; and (8) machine classes for enabling an application to access in an object-oriented manner operating system services to define and modify a host and processor sets.

Further features and advantages of the present invention, as well as the structure and operation of various embodiments of the present invention, are described in detail below with reference to the accompanying drawings, and in the claims. In the drawings, identical reference 10 numbers indicate identical or functionally similar elements.

BRIEF DESCRIPTION OF THE DRAWINGS

The present invention will be described with reference to the accompanying drawings, wherein.

DETAILED DESCRIPTION OF THE PREFERRED EMBODIMENTS

Computing Environment

The present invention is directed to a system and method for providing an object-oriented interface to a procedural operating system having a native procedural interface. The present invention emulates an object-oriented software environment on a computer platform having a procedural operating system. More particularly, the present invention is directed to a system and method of enabling an object-oriented application to access in an object-oriented manner a procedural operating system having a native procedural interface during run-time execution of the application in a computer. The present invention is preferably a part of the run-time environment of the computer in which the application executes. In this patent application, the present invention is sometimes called an object-oriented wrapper since it operates to wrap a procedural operating system with an object-oriented software layer such that an object-oriented application can access the operating system in an object-oriented manner.

Figure 1:
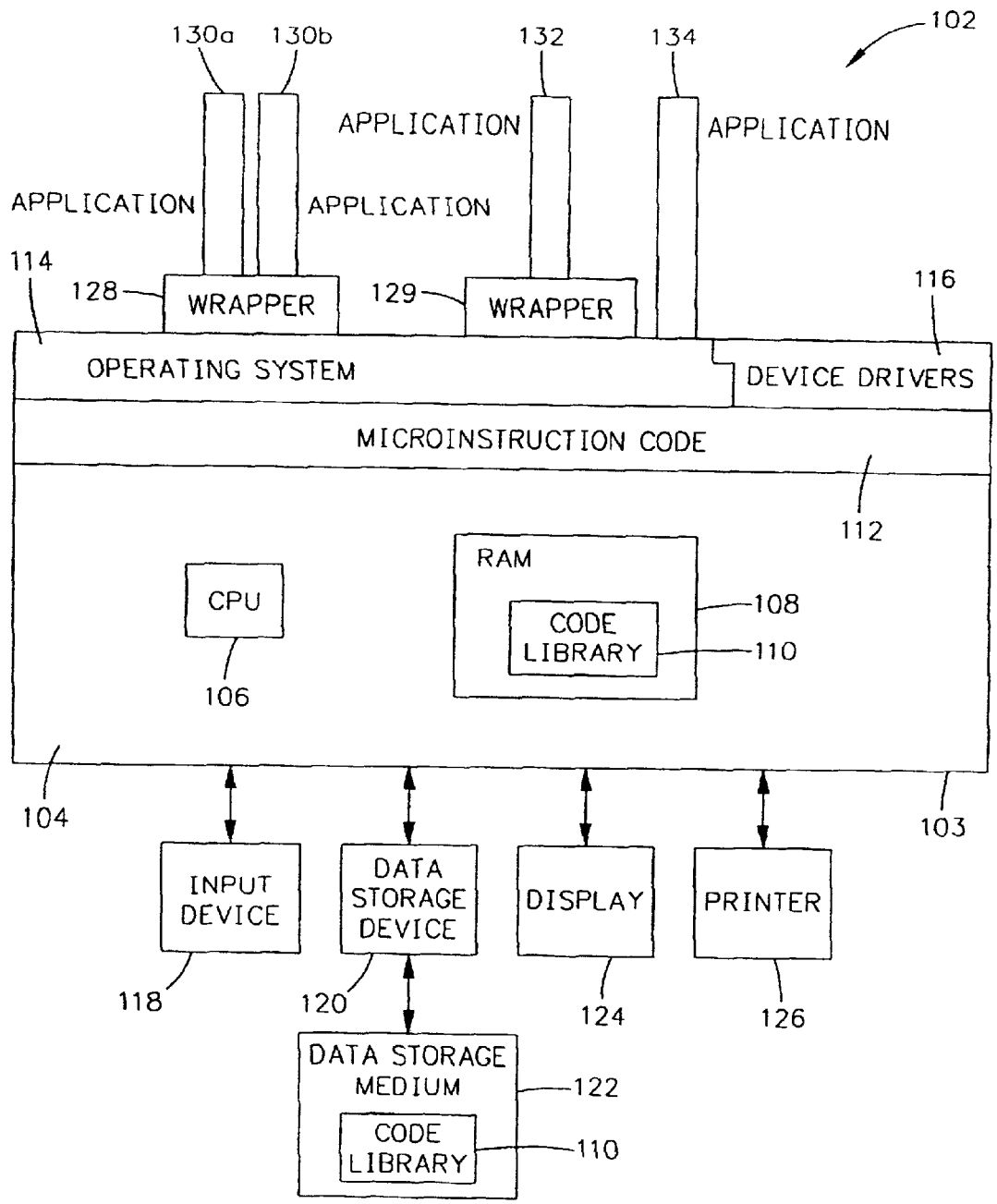
FIG. 1 illustrates a block diagram of a computer platform in which a wrapper of the present invention operates.

FIG. 1 illustrates a block diagram of a computer platform 102 in which a wrapper 128, 129 of the present invention operates. It should be noted that the present invention alternatively encompasses the wrapper 128,129 in combination with the computer platform 102. The computer platform 102 includes hardware components 103, such as a random access memory (RAM) 108 and a central processing unit (CPU) 106. It should be noted that the CPU 106 may represent a single processor, but preferably represents multiple processors operating in parallel. The computer platform 102 also includes peripheral devices which are connected to the hardware components 103. These peripheral devices include an input device or devices (such as a keyboard, a mouse, a light pen, etc.), a data storage device 120 (such as a hard disk or floppy disk), a display 124, and a printer 126. The data storage device 120 may interact with a removable data storage medium 122 (such as a removable hard disk, a magnetic tape cartridge, or a floppy disk), depending on the type of data storage device used. The computer platform 102 also includes a procedural operating system 114 having a native procedural interface (not shown). The procedural interface includes procedural functions which are called to access services provided by the operating system 102.

The computer platform 102 further includes device drivers 116, and may include microinstruction code 210 (also called firmware). As indicated in FIG. 1, in performing their required functions the device drivers 116 may interact with the operating system 114. Application programs 130, 132, 134 (described further below) preferably interact with the device drivers 116 via the operating system 114, but may alternatively interact directly with the device drivers 116. It should be noted that the operating system 114 may represent a substantially full-function operating system, such as the Disk Operating System (DOS) and the UNIX operating system. However, the operating system 114 may represent other types of operating systems. For purposes of the present invention, the only requirement is that the operating system 114 be a procedural operating system having a native procedural interface. Preferably, the operating system 114 represents a limited functionality procedural operating system, such as the Mach micro-kernel developed by CMU, which is well-known to those skilled in the relevant art. For illustrative purposes only, the present invention shall be described herein with reference to the Mach micro-kernel. In a preferred embodiment of the present invention, the computer platform 102 is an International Business Machines (IBM) computer or an IBM-compatible computer. In an alternate embodiment of the present invention, the computer platform 102 is an Apple computer.

Overview of a Wrapper

Various application programs 130, 132, 134 preferably operate in parallel on the computer platform 102. Preferably, the application programs 130, 132, 134 are adapted to execute in different operating environments. For example, the application programs 130A and 130B may be adapted to operate in an object-oriented environment. The application program 132 may be adapted to operate in a Microsoft Windows environment, an IBM PS/2 environment, or a Unix environment. As will be appreciated by those skilled in the relevant art, the application programs 130A, 130B, and 132 cannot interact directly with the operating system 114 unless the operating system 114 implements an environment in which the application programs 130A, 130B, and 132 are adapted to operate. For example, if the application 132 is adapted to operate in the IBM PS/2 environment, then the application 132 cannot directly interact with the operating system 114 unless the operating system 114 is the IBM PS/2 operating system (or compatible). If the application programs 130A and 130B are adapted to operate in an object-oriented environment, then the applications 130A, 130B cannot directly interact with the operating system 114 since the operating system 114 has a procedural interface. In the example shown in FIG. 1, the application 134 is adapted to operate in the computing environment created by the operating system 114, and therefore the application 134 is shown as being connected directly to the operating system 114.

The wrapper 128 is directed to a mechanism for providing the operating system 114 with an object-oriented interface. The wrapper 128 enables the object-oriented applications 130A, 130B to directly access in an object-oriented manner the procedural operating system 114 during run-time execution of the applications 130A, 130B on the computer platform 102. The wrapper 129 is conceptually similar to the wrapper 128. The wrapper 129 provides an IBM PS/2 interface for the operating system 114, such that the application 132 can directly access in a PS/2 manner the procedural operating system 114 (assuming that the application 132 is adapted to operate in the IBM PS/2 environment). The discussion of the present invention shall be limited herein to the wrapper 128, which provides an object-oriented interface to a procedural operating system having a native procedural interface.

The wrapper 128 is preferably implemented as a code library 110 which is stored in the RAM 108. The code library 110 may also be stored in the data storage device 120 and/or the data storage medium 122. The code library 110 implements an object-oriented class library 402 (see FIG. 4). In accordance with the present invention, the object-oriented class library 402 includes related object-oriented classes for enabling an object-oriented application (such as the applications 130A and 130B) to access in an object-oriented manner services provided by the operating system 114. The object-oriented classes comprise methods which include procedural function calls compatible with the native procedural interface of the operating system 114. Object-oriented statements defined by the object-oriented class library 402 (such as object-oriented statements which invoke one or more of the methods of the class library 402) are insertable into the application 130 to enable the application 130 to access in an object-oriented manner the operating system services during run-time execution of the application 130 on the computer platform 102. The object-oriented class library 402 is further described in sections below.

The code library 110 preferably includes compiled, executable computer program logic which implements the object-oriented class library 402. The computer program logic of the code library 110 is not linked to application programs. Instead, relevant portions of the code library 110 are copied into the executable address spaces of processes during run-time. This is explained in greater detail below. Since the computer program logic of the code library 110 is not linked to application programs, the computer program logic can be modified at any time without having to modify, recompile and/or relink the application programs (as long as the interface to the code library 110 does not change). As noted above, the present invention shall be described herein with reference to the Mach micro-kernel, although the use of the present invention to wrap other operating systems falls within the scope of the present invention.

Figure 4:
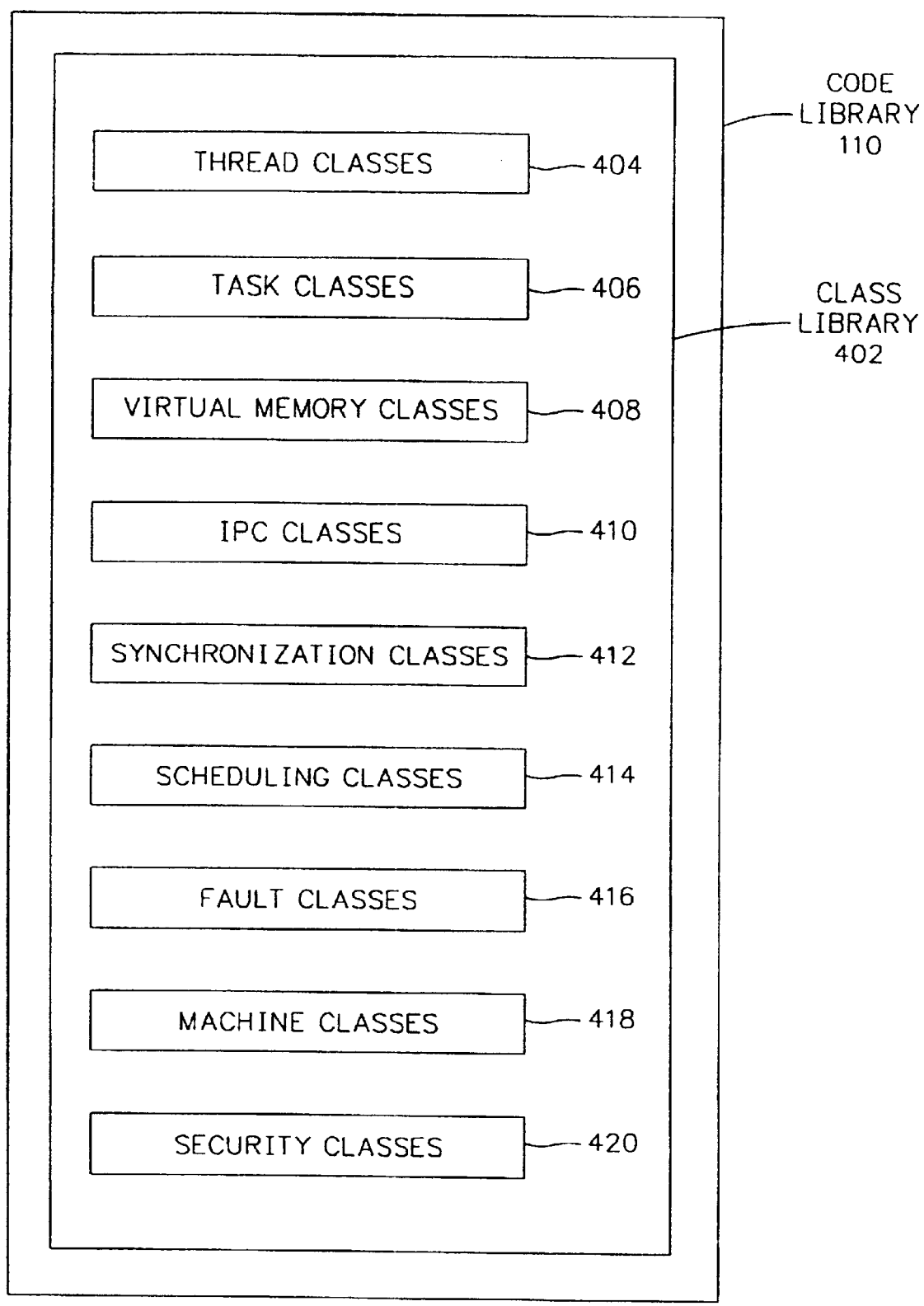
FIG. 4 is a block diagram of a code library containing an object-oriented class library of the present invention.

The Mach micro-kernel provides users with a number of services with are grouped into the following categories: threads, tasks, virtual memory, interprocess communication (IPC), scheduling, synchronization, fault processing, and host/processor set processing. The class library 402 of the present invention includes a set of related classes for each of the Mach service categories. Referring to FIG. 4, the class library 402 includes:

(1) thread classes 404 for enabling an application to access in an object-oriented manner operating system services to spawn, control, and obtain information relating to threads;

(2) task classes 406 for enabling an application to access in an object-oriented manner operating system services to reference and control tasks, wherein the tasks each represents an execution environment for threads respectively associated with the tasks;

(3) virtual memory classes 408 for enabling an application to access in an object-oriented manner operating system services to access and manipulate virtual memory in a computer;

(4) IPC classes 410 for enabling an application to access in an object-oriented manner operating system services to communicate with other processes during run-time execution of the application in a computer;

(5) synchronization classes 412 for enabling an application to access in an object-oriented manner operating system services to synchronize execution of threads;

(6) scheduling classes 414 for enabling an application to access in an object-oriented manner operating system services to schedule execution of threads;

(7) fault classes 416 for enabling an application to access in an object-oriented manner operating system services to process system and user-defined processor faults; and (8) machine classes 418 for enabling an application to access in an object-oriented manner operating system services to define and modify a host and processor sets.

The class library 402 may include additional classes for other service categories that are offered by Mach in the future. For example, security services are currently being developed for Mach. Accordingly, the class library 402 may also include security classes 420 for enabling an application to access in an object-oriented manner operating system security services. As will be appreciated, the exact number and type of classes included in the class library 402 depends on the implementation of the underlying operating system.

OPERATIONAL OVERVIEW OF A PREFERRED EMBODIMENT

Figure 2:
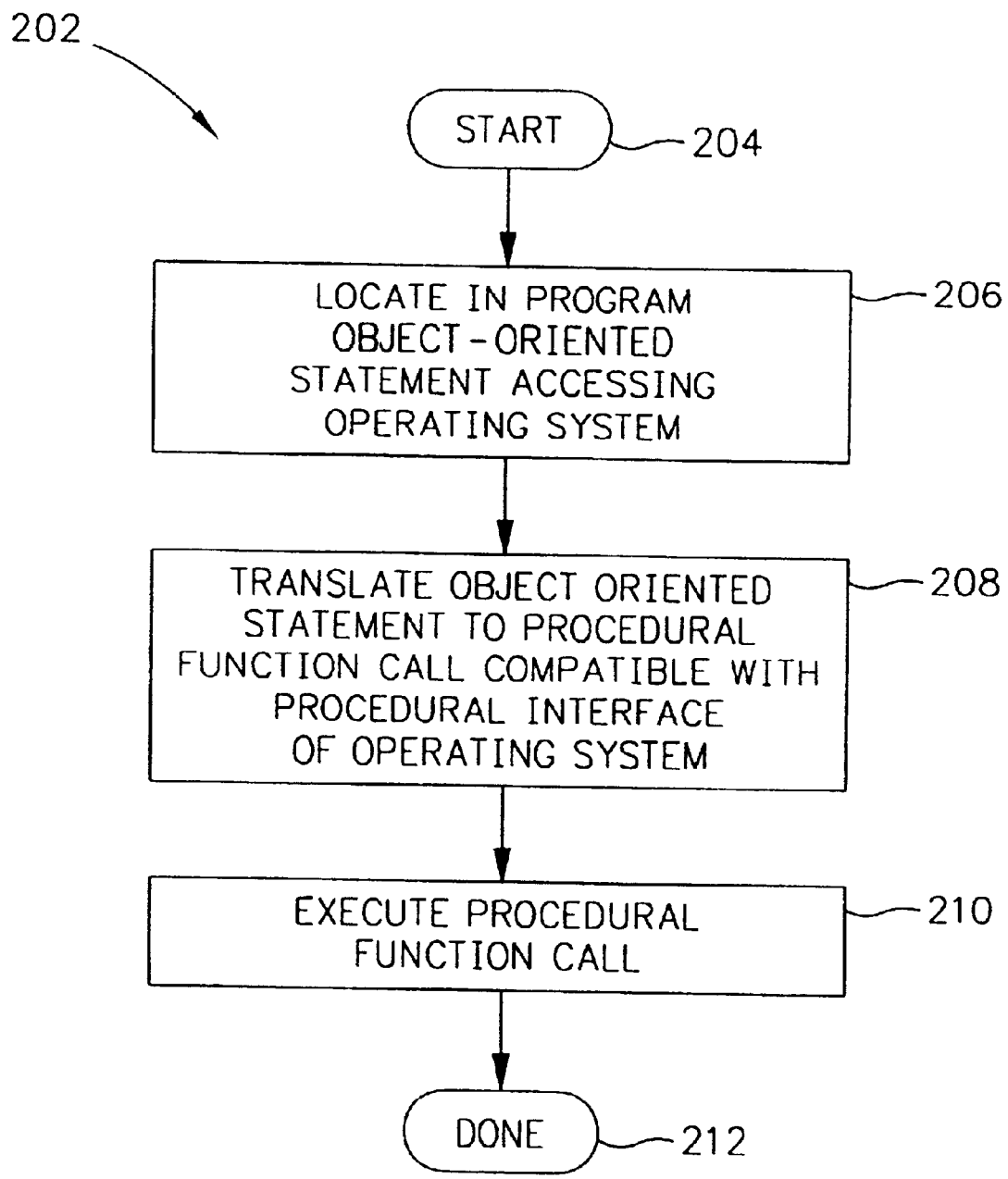
FIG. 2 is a high-level flow chart illustrating the operation of the present invention.

The operation of the present invention shall now be generally described with reference to FIG. 2, which illustrates a high-level operational flow chart 202 of the present invention. The present invention is described in the context of executing the object-oriented application 130A on the computer platform 102. In step 206, which is the first substantive step of the flow chart 202, an object-oriented statement which accesses a service provided by the operating system 114 is located in the application 130. A during the execution of the application 130A on the computer platform 102. The object-oriented statement is defined by the object-oriented class library 402. For example, the object-oriented statement may reference a method defined by one of the classes of the class library 402. The following steps describe the manner in which the statement is executed by the computer platform 102.

In step 208, the object-oriented statement is translated to a procedural function call compatible with the native procedural interface of the operating system 114 and corresponding to the object-oriented statement. In performing step 208, the statement is translated to the computer program logic from the code library 110 which implements the method referenced in the statement As noted above, the method includes at least one procedural function call which is compatible with the native procedural interface of the operating system 114. In step 210, the procedural function call from step 208 is executed in the computer platform 102 to thereby cause the operating system 114 to provide the service on behalf of the application 130A. Step 210 is performed by executing the method discussed in step 208, thereby causing the procedural function call to be invoked.

The operation of a preferred embodiment shall now be described in more detail with reference to FIG. 3, which illustrates a detailed operational flow chart 302 of the present invention. Again, the present invention is described in the context of executing the object-oriented application 130A on the computer platform 102. More particularly, the present invention is described in the context of executing a single object-oriented statement of the object-oriented application 130A on the computer platform 102. The application 130A includes statements which access services provided by the operating system 114, and it is assumed that such statements are defined by the class library 402 (in other words, the programmer created the application 130A with reference to the class library 402). As will be discussed in greater detail below, the executable entity in the Mach micro-kernel is called a thread. The processing organization entity in the Mach micro-kernel is called a task. A task includes one or more threads (which may execute in parallel), and an address space which represents a block of virtual memory in which the task's threads can execute. At any time, there may be multiple tasks active on the computer platform 102. When executing on the computer platform 102, the application 130A could represent an entire task (having one or more threads), or could represent a few threads which are part of a task (in this case, the task would have other threads which may or may not be related to the operation of the application 130A). The scope of the present invention encompasses the case when the application 130A is an entire task, or just a few threads of a task.

Figure 3:
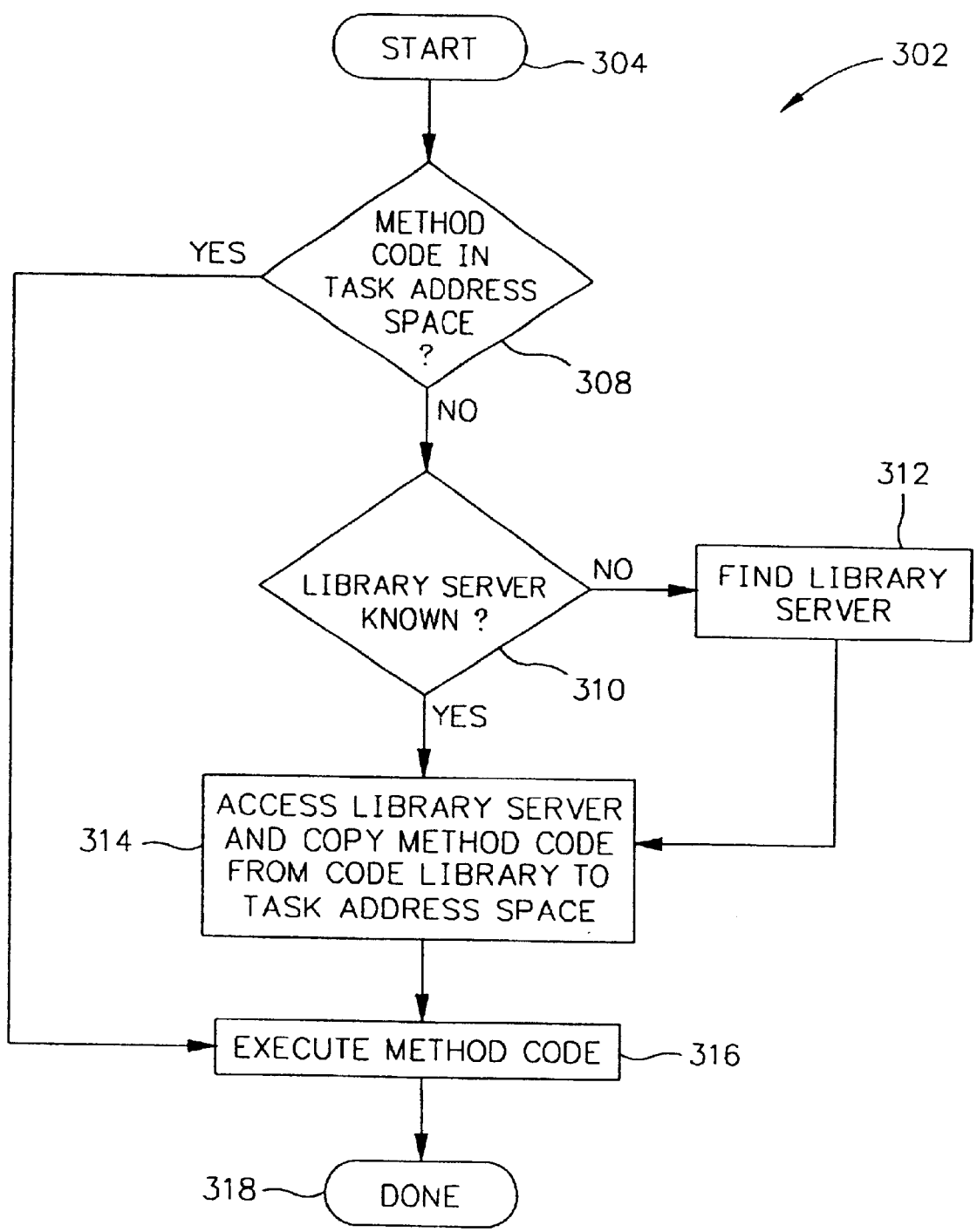
FIG. 3 is a more detailed flowchart illustrating the operation of the present invention.

Referring now to FIG. 3, in step 308, it is determined whether the computer program logic (also called computer code) from the code library 110 which implements the method referenced in the statement is present in the task address space associated with the application 130A. If the computer program logic is present in the task address space, then step 316 is processed (described below). If the computer program logic is not present in the task address space, then the computer program logic is transferred to the task address space in steps 310,312, and 314. In step 310, it is determined whether the library server (not shown) associated with the code library 110 is known. The code library 110 may represent multiple code libraries (not shown) related to the wrapper 128, wherein each of the code libraries include the computer program logic for one of the object-oriented classes of the class library 402. As those skilled in the relevant art will appreciate, there may also be other code libraries (not shown) completely unrelated to the wrapper 128.

Associated with the code libraries are library servers, each of which manages the resources of a designated code library. A processing entity which desires access to the computer program logic of a code library makes a request to the code library's library server. The request may include, for example, a description of the desired computer program logic and a destination address to which the computer program logic should be sent. The library server processes the request by accessing the desired computer program logic from the code library and sending the desired computer program logic to the area of memory designated by the destination address. The structure and operation of library servers are well known to those skilled in the relevant art. Thus, in step 310 it is determined whether the library server associated with the code library 110 which contains the relevant computer program logic is known. Step 310 is performed, for example, by referencing a library server table which identifies the known library servers and the code libraries which they service. If the library server is known, then step 314 is processed (discussed below). Otherwise, step 312 is processed. In step 312, the library server associated with the code library 110 is identified. The identity of the library server may be apparent, for example, from the content of the object-oriented statement which is being processed.

After the library server associated with the code library 110 is identified, or if the library server was already known, then step 314 is processed. In step 314, a request is sent to the library server asking the library server to copy the computer program logic associated with the method reference in the statement to the task address space. Upon completion of step 314, the library server has copied the requested computer program logic to the task address space. Preferably, the code library 110 is a shared library. That is, the code library 110 may be simultaneously accessed by multiple threads. However, preferably the computer program logic of the code library 110 is physically stored in only one physical memory area. The library server virtually copies computer program logic from the code library 110 to task address spaces. That is, instead of physically copying computer program logic from one part of physical memory to another, the library server places in the task address space a pointer to the physical memory area containing the relevant computer program logic. In step 316, the computer program logic associated with the object-oriented statement is executed on the computer platform 102. As noted above, in the case where the object-oriented statement accesses the operating system 114, the computer program logic associated with the method contains at least one procedural function call which is compatible with the native procedural interface of the operating system 114. Thus, by executing the method's computer program logic, the procedural function call is invoked and executed, thereby causing the operating system 114 to provide the service on behalf of the application 130A.

The above-described performance in the computer platform 102 of steps 306, 308, 310, 312, and 314 is due, in large part, to the run-time environment established in the computer platform 102. As will be appreciated by those skilled in the relevant art, the run-time environment of the computer platform 102 is defined by the run-time conventions of the particular compiler which compiles the application program 130A. For example, the run-time conventions may specify that when an instruction accessing an operating system service is encountered, corresponding code from the code library 110 should be transferred to the task address space (via the associated library server) and executed. Compiler run-time conventions are generally well known. As will be appreciated, run-time conventions are specific to the particular compilers used. The run-time conventions for use with the present invention and with a particular compiler would be apparent to one skilled in the art based on the disclosure of the present invention contained herein, particularly to the disclosure associated with the flow chart 302 in FIG. 3. As described above, the wrapper 128 of the present invention is implemented as a code library 110 which includes computer program logic implementing the object-oriented class library 402. Alternatively, the wrapper 128 may be implemented as a hardware mechanism which essentially operates in accordance with the flow chart 302 of FIG. 3 to translate object-oriented statements (defined by the class library 402) in application programs to procedural function calls compatible with the procedural interface of the operating system 114. Or, the wrapper 128 may be implemented as a background software process operating on the computer platform 102 which captures all accesses to the operating system 114 (made by object-oriented statements defined by the class library 402) and which translates the accesses to procedural function calls compatible with the procedural interface of the operating system 114. Other implementations of the wrapper 128 will be apparent to those skilled in the relevant art based on the disclosure of the present invention contained herein.

Mach Services

This section provides an overview of the abstractions and services provided by the Mach micro-kernel. The services are described for each of the major areas of the Mach micro-kernel. As noted above, these include: threads, tasks, virtual memory, IPC, scheduling, synchronization services, hardware faults, and host/privilege services (also called machine services). The Mach micro-kernel is further discussed in many publicly available documents, including: K. Loepere, editor, "Mach 3 Kernel Principles", Open Software Foundation and Carnegie Mellon University, Draft Industrial Specification, September 1992 and November 1992; K. Loepere, editor, "Mach 3 Kernel Interfaces", Open Software Foundation and Carnegie Mellon University, Draft Industrial Specification, September 1992 and November 1992; K. Loepere, editor, "Mach 3 Server Writer's Guide", Open Software Foundation and Carnegie Mellon University, Draft Industrial Specification, September 1992 and November 1992; K. Loepere, editor, "Mach 3 Server Writer's Interfaces", Open Software Foundation and Carnegie Mellon University, Draft Industrial Specification, September 1992 and November 1992; A. Silberschatz, J. Peterson, P. Galvin, Operating System Concepts, Addison-Wesley, July 1992; and A. Tanenbaum, Modern Operating Systems, Prentice Hall, 1992.

Threads

The executable entity in Mach is known as a thread. Threads have several aspects that enable them to execute in the system. A thread is always contained in a task, which represents most of the major resources (e.g., address space) of which the thread can make use. A thread has an execution state, which is basically the set of machine registers and other data that make up its context. A thread is always in one of several scheduling states: executing, ready to execute, or blocked for some reason. Threads are intended to be lightweight execution entities. This is to encourage the programmer to make use of multiple threads in applications, thus introducing more concurrency into the system than has been found in traditional operating systems. Although threads are not without some cost, they really are fairly minimal and the typical application or server in a Mach environment can take advantage of this capability.

Threads do have some elements associated with them, however. The containing task and address space, as well as the execution state, have already been discussed. Each thread has a scheduling policy, which determines when and how often the thread will be given a processor on which to run. The scheduling services are discussed in more detail in a later section. Closely tied to the scheduling policy of a thread is the optional processor set designation, which can be used in systems with multiple processors to more closely control the assignment of threads to processors for potentially greater application performance. As indicated before, an address space (task) can contain zero or more threads, which execute concurrently. The kernel makes no assumptions about the relationship of the threads in an address space or, indeed, in the entire system. Rather, it schedules and executes the threads according to the scheduling parameters associated with them and the available processor resources in the system. In particular, there is no arrangement (e.g., hierarchical) of threads in an address space and no assumptions about how they are to interact with each other. In order to control the order of execution and the coordination of threads to some useful end, Mach provides several synchronization mechanisms. The simplest (and coarsest) mechanism is thread-level suspend and resume operations. Each thread has a suspend count, which is incremented and decremented by these operations. A thread whose suspend count is positive remains blocked until the count goes to zero.

Finer synchronization can be obtained through the use of synchronization objects (semaphores or monitors and conditions), which allow a variety of different synchronization styles to be used. Threads can also interact via interprocess communication (IPC). Each of these services is described in more detail in later sections. Basic operations exist to support creation, termination, and getting and setting attributes for threads. Several other control operations exist on threads that can be performed by any thread that has a send right to the intended thread's control port. Threads can be terminated explicitly. They can also be interrupted from the various possible wait situations and caused to resume execution with an indication that they were interrupted. Threads can also be "wired", which means that they are marked as privileged with respect to kernel resources, i.e., they can consume physical memory when free memory is scarce. This is used for threads in the default page-out path. Finally, threads also have several important IPC ports (more precisely, the send or receive rights to these ports), which are used for certain functions. In particular, each thread has a thread selfport, which can be used to perform certain operations on the thread by itself. A thread also has a set of fault ports which is used when the thread encounters a processor fault during its execution. There is also a distinguished port that can be used for gathering samples of the thread's execution state for monitoring by other threads such as debuggers or program profilers.

Tasks

The basic organizational entity in Mach for which resources are managed is known as a task. Tasks have many objects and attributes associated with them. A task fundamentally comprises three things. A task contains multiple threads, which are the executable entities in the system. A task also has an address space, which represents virtual memory in which its threads can execute. And a task has a port name space, which represents the valid IPC ports through which threads can communicate with other threads in the system. Each of these fundamental objects in a task is discussed in greater detail in the following sections. Note that a task is not, of itself, an executable entity in Mach. However, tasks can contain threads, which are the execution entities. A task has a number of other entities associated with it besides the fundamental ones noted above. Several of these entities have to do with scheduling decisions the kernel needs to make for the threads contained by the task. The scheduling parameters, processor set designation, and host information all contribute to the scheduling of the task's threads. A task also has a number of distinguished interprocess communication ports that serve certain pre-defined functions. Ports and other aspects of interprocess communication are discussed at length in a later section. For now, it is sufficient to know that port resources are accumulated over time in a task. Most of these are managed explicitly by the programmer. The distinguished ports mentioned above generally have to do with establishing connections to several important functions in the system. Mach supplies three "special" ports with each task. The first is the task self port, which can be used to ask the kernel to perform certain operations on the task. The second special port is the bootstrap port, which can be used for anything (it's OS environment-specific) but generally serves to locate other services. The third special port that each task has is the host name port, which allows the task to obtain certain information about the machine on which it is running. Additionally, Mach supplies several "registered" ports with each task that allow the threads contained in the task to communicate with certain higher-level servers in the system (e.g., the Network Name Server, the "Service" Server, and the Environment Server).

Two other useful sets of ports exist for each task that allow fault processing and program state sampling to be performed. The fault ports of a task provide a common place for processor faults encountered by threads in the task to be processed. Fault processing is described more fully in a later section The PC sample port allows profiling tools to repeatedly monitor the execution state of the threads in the task. Many operations are possible for tasks. Tasks can be created and terminated. Creation of a new task involves specifying some existing task as a prototype for the initial contents of the address space of the new task. A task can also be terminated, which causes all of the contained threads to be terminated as well. The threads contained in a task can be enumerated and information about the threads can be extracted. Coarse-grain execution of a task (more precisely, the threads in the task) can be controlled through suspend and resume operations. Each task has a suspend count that is incremented and decremented by the suspend and resume operations. The threads in the task can execute as long as the suspend count for the containing task is zero. When the suspend count is positive, all threads in the task will be blocked until the task is subsequently resumed. Finally, the various parameters and attributes associated with a task (e.g., scheduling priority) can be queried and set as desired.

Virtual Memory

Mach supports several features in its virtual memory (VM) subsystem. Both the external client interfaces as well as the internal implementation offer features that are not found in many other operating systems. In broadest terms, the Mach virtual memory system supports a large sparsely populated virtual address space for each of the tasks running in the system. Clients are provided with general services for managing the composition of the address space. Some aspects of the VM system are actually implemented by components that are outside of the micro-kernel, which allows great flexibility in tailoring certain policy functions to different system environments. The internal architecture of the Mach VM system has been divided into machine-independent and machine-dependent modules for maximum portability. Porting to a new processor/MMU architecture is generally a small matter of implementing a number of functions that manipulate the basic hardware MMU structures. Mach has been ported to a number of different processor architectures attesting to the portability of the overall kernel and the virtual memory system in particular. The address space of a Mach task contains a number of virtual memory regions. These regions are pieces of virtual address space that have been allocated in various ways for use by the task. They are the only locations where memory can be legitimately accessed. All references to addresses outside of the defined regions in the address space will result in an improper memory reference fault. A virtual memory region has several interesting attributes. It has a page-aligned starting address and a size, which must be a multiple of the system page size. The pages in the region all have the same access protections; these access protections can be read-only, read-write, or execute. The pages in a region also have the same inheritance characteristic, which may be used when a new task is created from the current task. The inheritance characteristic for pages in a region can be set to indicate that a new task should inherit a read-write copy of the region, that it should inherit a virtual copy of the region, or that it should inherit no copy of the region. A read-write copy of a region in a new address space provides a fully shared mapping of the region between the tasks, while a virtual copy provides a copy-on-write mapping that essentially gives each task its own copy of the region but with efficient copy-on-write sharing of the pages constituting the region.

Every virtual memory region is really a mapping of an abstract entity known as a memory object. A memory object is simply a collection of data that can be addressed in some byte-wise fashion and about which the kernel makes no assumptions. It is best thought of as some pure piece of data that can either be explicitly stored some place or can be produced in some fashion as needed. Many different things can serve as memory objects. Some familiar examples include files, ROMs, disk partitions, or fonts. Memory objects have no pre-defined operations or protocol that they are expected to follow. The data contained in a memory object can only be accessed when it has been tied to a VM region through mapping. After a memory object has been mapped to a region, the data can be accessed via normal memory read and write (load and store) operations. A memory object is generally managed by a special task known as an external memory manager or pager. A pager is a task that executes outside of the micro-kernel much like any other task in the system. It is a user-mode entity whose job is to handle certain requests for the data of the memory objects it supports. As threads in a client task reference the pages in a given region, the kernel logically fills the pages with the data from the corresponding byte addresses in the associated memory object. To accomplish this the kernel actually engages in a well-defined (and onerous) protocol with the pager whenever it needs to get data for page faults or when it needs to page-out data due to page replacements. This protocol, which is known as the External Memory Management Interface (or EMMI), also handles the initialization sequences for memory objects when they are mapped by client tasks and the termination sequences when any associated memory regions are deallocated by client tasks.

There can be any number of pagers running in the system depending on which memory objects are in use by the various client tasks. Pagers will typically be associated with the various file systems that are mounted at a given time, for example. Pagers could also exist to support certain database applications, which might have needs for operations beyond what is supported by the file system. Pagers could also exist for certain servers that wish to supply data to their clients in non-standard ways (e.g., generating the data computationally rather than retrieving it from a storage subsystem). The micro-kernel always expects to have a certain distinguished pager known as the default pager running in the system. The default pager is responsible for managing the memory objects associated with anonymous virtual memory such stacks, heaps, etc. Such memory is temporary and only of use while a client task is running. As described above, the main entities in the Mach VM system are regions, memory objects, and pagers. Most clients, however, will deal with virtual memory through operations on ranges of memory. A range can be a portion of a region or it could span multiple contiguous regions in the address space. Operations are provided by Mach that allow users to allocate new ranges of virtual memory in the address space and deallocate ranges as desired. Another important operation allows a memory object to be mapped into a range of virtual memory as described above. Operations are also available to change the protections on ranges of memory, change the inheritance characteristics, and wire (or lock) the pages of a range into physical memory. It is also possible to read ranges of memory from another task or write into ranges in another task provided that the control port for the task is available. Additional services are available that allow the user to specify the expected reference pattern for a range of memory. This can be used by the kernel as advice on ways to adapt the page replacement policy to different situations. Yet another service is available to synchronize (or flush) the contents of a range of memory with the memory object(s) backing it. Finally services are available to obtain information about regions and to enumerate the contents of a task's address space described in terms of the regions it contains.

Interprocess Communication

Mach has four concepts that are central to its interprocess communications facilities: Ports, Port Sets, Port Rights, and Messages. One of these concepts, Port Rights, is also used by Mach as a means to identify certain common resources in the system (such as threads, tasks, memory objects, etc.).

Ports

Threads use ports to communicate with each other. A port is basically a message queue inside the kernel that threads can add messages to or remove message from, if they have the proper permissions to do so. These "permissions" are called port rights. Other attributes associated with a port, besides port rights, include a limit on the number of messages that can be enqueued on the port, a limit on the maximum size of a message that can be sent to a port, and a count of how many rights to the port are in existence. Ports exist solely in the kernel and can only be manipulated via port rights.

Port Rights

A thread can add a message to a port's message queue if it has a send right to that port. Likewise, it can remove a message from a port's message queue if it has a receive right to that port. Port rights are considered to be resources of a task, not an individual thread. There can be many send rights to a port (held by many different tasks); however, there can only be one receive right to a port. In fact, a port is created by allocating a receive right and a port is destroyed only when the receive right is deallocated (either explicitly or implicitly when the task dies). In addition, the attributes of a port are manipulated through the receive right. Multiple threads (on the same or different tasks) can send to a port at the same time, and multiple threads (on the same task) can receive from a port at the same time. Port rights act as a permission or capability to send messages to or receive messages from a port, and thus they implement a low-level form of security for the system. The "owner" of a port is the task that holds the receive right. The only way for another task to get a send right for a port is if it is explicitly given the right—either by the owner or by any task that holds a valid send right for the port. This is primarily done by including the right in a message and sending the message to another task. Giving a task a send right grants it permission to send as many messages to the port as it wants. There is another kind of port right called a send-once right that only allows the holder to send one message to the port, at which time the send-once right become invalid and can't be used again. Note that ownership of a port can be transferred by sending the port's receive right in a message to another task. Tasks acquire port rights either by creating them or receiving them in a message. Receive rights can only be created explicitly (by doing a port allocate, as described above); send rights can be created either explicitly from an existing send or receive right or implicitly while being transmitted in a message. A send-once right can be created explicitly or implicitly from a receive right only. When a right is sent in a message the sender can specify that the right is either copied, moved, or a new right created by the send operation. (Receive rights can only be moved, of course.) When a right is moved, the sender looses the right and the receiver gains it. When copied, the sender retains the right but a copy of the right is created and given to the receiver. When created, the sender provides a receive right and a new send or send-once right is created and given to the receiver. When a task acquires a port right, by whatever means, Mach assigns it a name. Note that ports themselves are not named, but their port rights are. (Despite this fact, the creators of Mach decided to refer to the name of a port right with the term port name, instead of the obvious port right name). This name is a scalar value (32-bits on Intel machines) that is guaranteed unique only within a task (which means that several tasks could each have a port name with the same numeric value but that represent port rights to totally different ports) and is chosen at random. Each distinct right held by a task does not necessarily have a distinct port name assigned to it. Send-once rights always have a separate name for each right. Receive and send rights that refer to the same port, however, will have the same name.

Port rights have several attributes associated with them: the type of the right (send, send-once, receive, port set, or dead name), and a reference count for each of the above types of rights. When a task acquires a right for a port to which it already has send or receive rights, the corresponding reference count for the associated port name is incremented. A port name becomes a dead name when its associated port is destroyed. That is, all port names representing send or send-once rights for a port whose receive right is deallocated become dead names. A task can request notification when one of its rights becomes dead. The kernel keeps a system-wide count of the number of send and send-once rights for each port. Any task that holds a receive right (such as a server) can request a notification message be sent when this number goes to zero, indicating that there are no more senders (clients) for the port. This is called a no more senders notification. The request must include a send right for a port to which the notification should be sent.

Port Sets

Port sets provide the ability to receive from a collection of ports simultaneously. That is, receive rights can be added to a port set such that when a receive is done on the port set, a message will be received from one of the ports in the set. The name of the receive right whose port provided the message is reported by the receive operation.

Messages

A Mach IPC message comprises a header and an in-line data portion, and optionally some out-of-line memory regions and port rights. If the message contains neither port rights nor out-of-line memory, then it is said to be a simple message; otherwise it is a complex message. A simple message contains the message header directly followed by the in-line data portion. The message header contains a destination port send right, an optional send right to which a reply may be sent (usually a send-once right), and the length of the data portion of the message. The in-line data is of variable length (subject to a maximum specified on a per-port basis) and is copied without interpretation. A complex message consists of a message header (with the same format as for a simple message), followed by: a count of the number of out-of-line memory regions and ports, disposition arrays describing the kernel's processing of these regions and ports, and arrays containing the out-of-line descriptors and the port rights.

The port right disposition array contains the desired processing of the right, i.e., whether it should be copied, made, or moved to the target task. The out-of-line memory disposition array specifies for each memory range whether or not it should be de-allocated when the message is queued, and whether the memory should be copied into the receiving task's address space or mapped into the receiving address space via a virtual memory copy-on-right mechanism. The out-of-line descriptors specify the size, address, and alignment of the out-of-line memory region. When a task receives a message, the header, in-line data, and descriptor arrays are copied into the addresses designated in the parameters to the receive call. If the message contains out-of-line data, then virtual memory in the receiving task's address space is automatically allocated by the kernel to hold the out-of-line data. It is the responsibility of the receiving task to deallocate these memory regions when they are done with the data.

Message Transmission Semantics

Mach IPC is basically asynchronous in nature. A thread sends a message to a port, and once the message is queued on the port the sending thread continues execution. A receive on a port will block if there are no messages queued on the port. For efficiency there is a combined send/receive call that will send a message and immediately block waiting for a message on a specified reply port (providing a synchronous model). A time-out can be set on all message operations which will abort the operation if the message is unable to be sent (or if no message is available to be received) within the specified time period. A send call will block if it uses a send-right whose corresponding port has reached its maximum number of messages. If a send uses a send-once right, the message is guaranteed to be queued even if the port is fill. Message delivery is reliable, and messages are guaranteed to be received in the order they are sent. Note that there is special-case code in Mach which optimizes for the synchronous model over the asynchronous model; the fastest IPC round-trip time is achieved by a server doing a receive followed by repeated send/receive's in a loop and the client doing corresponding send/receive's in a loop on its side.

Port Rights as Identifiers

Because the kernel guarantees both that port rights cannot be counterfeited and that messages cannot be misdirected or falsified, port rights provide a very reliable and secure identifier. Mach takes advantage of this by using port rights to represent almost everything in the system, including tasks, threads, memory objects, external memory managers, permissions to do system-privileged operations, processor allocations, and so on. In addition, since the kernel can send and receive messages itself (it represents itself as a "special" task), the majority of the kernel services are accessed via IPC messages instead of system-call traps. This has allowed services to be migrated out of the kernel fairly easily where appropriate.

Synchronization

Currently, Mach provides no direct support for synchronization capabilities. However, conventional operating systems routinely provide synchronization services. Such synchronization services employ many well-known mechanisms, such as semaphores and monitors and conditions, which are described below. Semaphores are a synchronization mechanism which allows both exclusive and shared access to a resource. Semaphores can be acquired and released (in either an exclusive or shared mode), and they can optionally specify time-out periods on the acquire operations. Semaphores are optionally recoverable in the sense that when a thread that is holding a semaphore terminates prematurely, the counters associated with the semaphore are adjusted and waiting threads are unblocked as appropriate.

Monitors and conditions are a synchronization mechanism which implements a relatively more disciplined (and safer) style of synchronization than simple semaphores. A monitor lock (also called a mutex) is essentially a binary semaphore that enables mutually exclusive access to some data. Condition variables can be used to wait for and signify the truth of certain programmer-defined Boolean expressions within the context of the monitor. When a thread that holds a monitor lock needs to wait for a condition, the monitor lock is relinquished and the thread is blocked. Later, when a another thread that holds the lock notifies that the condition is true, a waiting thread is unblocked and then re-acquires the lock before continuing execution. A thread can also perform a broadcast operation on a condition, which unblocks all of the threads waiting for that condition. Optional time-outs can also be set on the condition wait operations to limit the time a thread will wait for the condition.

Scheduling

Since Mach is multiprocessor capable, it provides for the scheduling of threads in a multiprocessor environment. Mach defines processor sets to group processors and it defines scheduling policies that can be associated with them. Mach provides two scheduling policies: timeshare and fixed priority. The timeshare policy is based on the exponential average of the threads' usage of the CPU. This policy also attempts to optimize the time quantum based on the number of threads and processors. The fixed priority policy does not alter the priority but does round-robin scheduling on the threads that are at the same priority. A thread can use the default scheduling policy of its processor set or explicitly use any one of the scheduling policies enabled for its processor set. A maximum priority can be set for a processor set and thread. In Mach the lower the priority value, the greater the urgency.

Faults

The Mach fault handling services are intended to provide a flexible mechanism for handling both standard and user-defined processor faults. The standard kernel facilities of threads, messages, and ports are used to provide the fault handling mechanism. (This document uses the word "fault" where the Mach documentation uses the word "exception". Such terminology has been changed herein to distinguish hardware faults from the exception mechanism of the C++ language). Threads and task have fault port(s). They differ in their inheritance rules and are expected to be used in slightly different ways. Error handling is expected to be done on a per-thread basis and debugging is expected to be handled on a per-task basis. Task fault ports are inherited from parent to child tasks, while thread fault ports are not inherited and default to no handler. Thread fault handlers take precedence over task fault handlers. When a thread causes a fault the kernel blocks the thread and sends a fault message to the thread's fault handler via the fault port. A handler is a task that receives a message from the fault port. The message contains information about the fault, the thread, and the task causing the fault. The handler performs its function according to the type of the fault. If appropriate, the handler can get and modify the execution state of the thread that caused the fault. Possible actions are to clear the fault, to terminate the thread, or to pass the fault on to the task-level handler. Faults are identified by types and data. Mach defines some machine-independent fault types that are supported for all Mach implementations (e.g., bad access, bad instruction, breakpoint, etc.). Other fault types can be implementation dependent (e.g., f-line, co-processor violation, etc.).

Host and Processor Sets

Mach exports the notion of the host, which is essentially an abstraction for the computer on which it is executing.

Various operations can be performed on the host depending on the specific port rights that a task has for the host. Information that is not sensitive can be obtained by any task that holds a send right to the host name port. Examples of such information include the version of the kernel or the right to gain access to the value of the system clock. Almost all other information is considered sensitive, and a higher degree of privilege is required to get or manipulate the information. This added level of privilege is implied when a task holds a send right to the host control port (also known as the host privilege port). This right must be given out very carefully and selectively to tasks, because having this right enables a task to do virtually everything possible to the kernel, thus by-passing the security aspects of the system supported by the IPC services. Various operations can be performed with this added privilege, including altering the system's clock setting, obtaining overall performance and resource usage statistics for the system, and causing the machine to re-boot.

Mach also exports the notions of processors and processor sets, which allow tasks to more carefully specify when and on what processors its threads should execute. Processors and processor sets can be enumerated and controlled with the host privilege port. A processor represents a particular processor in the system, and a processor set represents a collection of processors. Services exist to create new processor sets and to add processors to a set or remove them as desired. Services also exist to assign entire tasks or particular threads to a set. Through these services a programmer can control (on a coarse grain) when the threads and tasks that constitute an application actually get to execute. This allows a programmer to specify when certain threads should be executed in parallel in a processor set. The default assignment for tasks and threads that do not explicitly use these capabilities is to the system default processor set, which generally contains any processors in the system that aren't being used in other sets.

Security

Mach may include other categories of services in addition to those described above. For example, Mach may include services relating to security. In accordance with the Mach security services, every task carries a security token, which is a scalar value that is uninterpreted by Mach. There is a port called the host security port that is given to the bootstrap task and passed on to the trusted security sever. A task's security token can be set or changed by any task that holds a send right to the host security port, while no special permissions are needed to determine the value of a tasks security token (other than holding the task's control port, of course). At the time a Mach IPC message is received, the security token of the sender of the message is returned as one of the output parameters to the receive function. Tasks that hold the host security port can send a message and assign a different security token to that message, so that it appears to have come from another task. These services can be used by upper layers of the system to implement various degrees of security.

Wrapper Class Library

This section provides an area-by-area description of the object-oriented interface for the services provided by the Mach micro-kernel. This object-oriented interface to the Mach services represents the wrapper class library 402 as implemented by the code library 110. The wrapper class library 402 includes thread classes 404, task classes 406, virtual memory classes 408, IPC classes 410, synchronization classes 412, scheduling classes 414, fault classes 416, and machine classes 418 are discussed. The wrapper class library 402 may include additional classes, such as security classes 420, depending on the services provided by the underlying operating system 114. Each area is described with a class diagram and text detailing the purpose and function of each class. Selected methods are presented and defined (where appropriate, the parameter list of a method is also provided). Thus, this section provides a complete operational definition and description of the wrapper class library 402. The implementation of the methods of the wrapper class library 402 is discussed in a later section.

Figure 17:
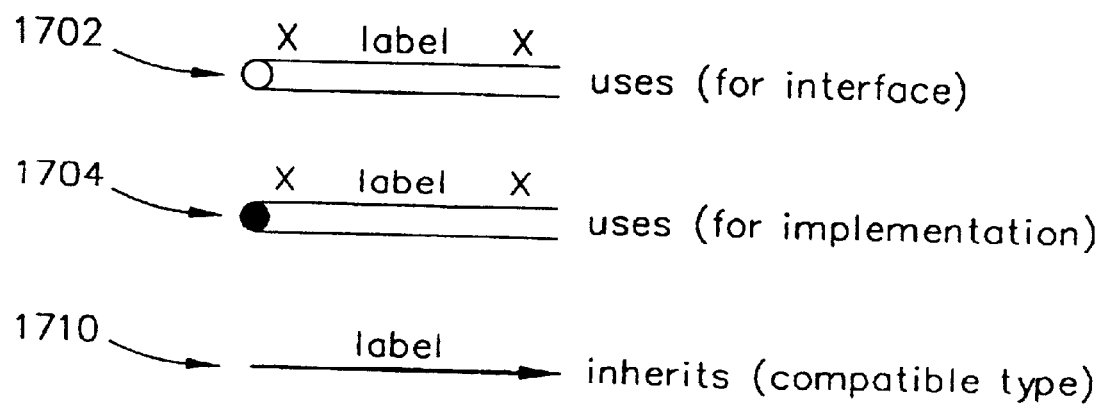
FIG. 17 illustrates well-known icons for representing class relationships and cardinality in class diagrams.

The class diagrams are presented using the well-known Booch icons for representing class relationships and cardinality. These Booch icons are presented in FIG. 17 for convenience purposes. The Booch icons are discussed in Object Oriented Design With Applications by Grady Booch, referenced above. The wrapper class library 402 is preferably implemented using the well-known C++ computer programming language. However, other programming languages could alternatively be used. Preferably, the class descriptions are grouped into SPI (System Programming Interface), API (Application Programming Interface), Internal, and "Noose" methods—indicated by #ifndef statements bracketing the code in question (or by comments for Noose methods). SPI interfaces are specific to the particular computer platform being used. For illustrative purposes, the wrapper class library 402 is presented and described herein with respect to a computer platform operating in accordance with the IBM MicroKernel (which is based on Mach Version 3.0) or compatible. Persons skilled in the relevant art will find it apparent to modify the SPI classes to accommodate other computer platforms based on the teachings contained herein.

API interfaces are included in the wrapper class library 402 regardless of the platform the system is running on. The Internal interfaces are intended for use only by low-level implementors. The Noose methods are provided solely to enable an application 130 operating with the wrapper 128 to communicate with an application 134 (or server) that was written to run on Mach 114 directly. They provide access to the raw Mach facilities in such a way that they fall outside of the intended object-oriented programming model established by the wrapper 128. Use of Noose methods is highly discouraged. The SPI and API (and perhaps the Internal) classes and methods are sufficient to implement any application, component, or subsystem.

Thread Classes

Figure 5:
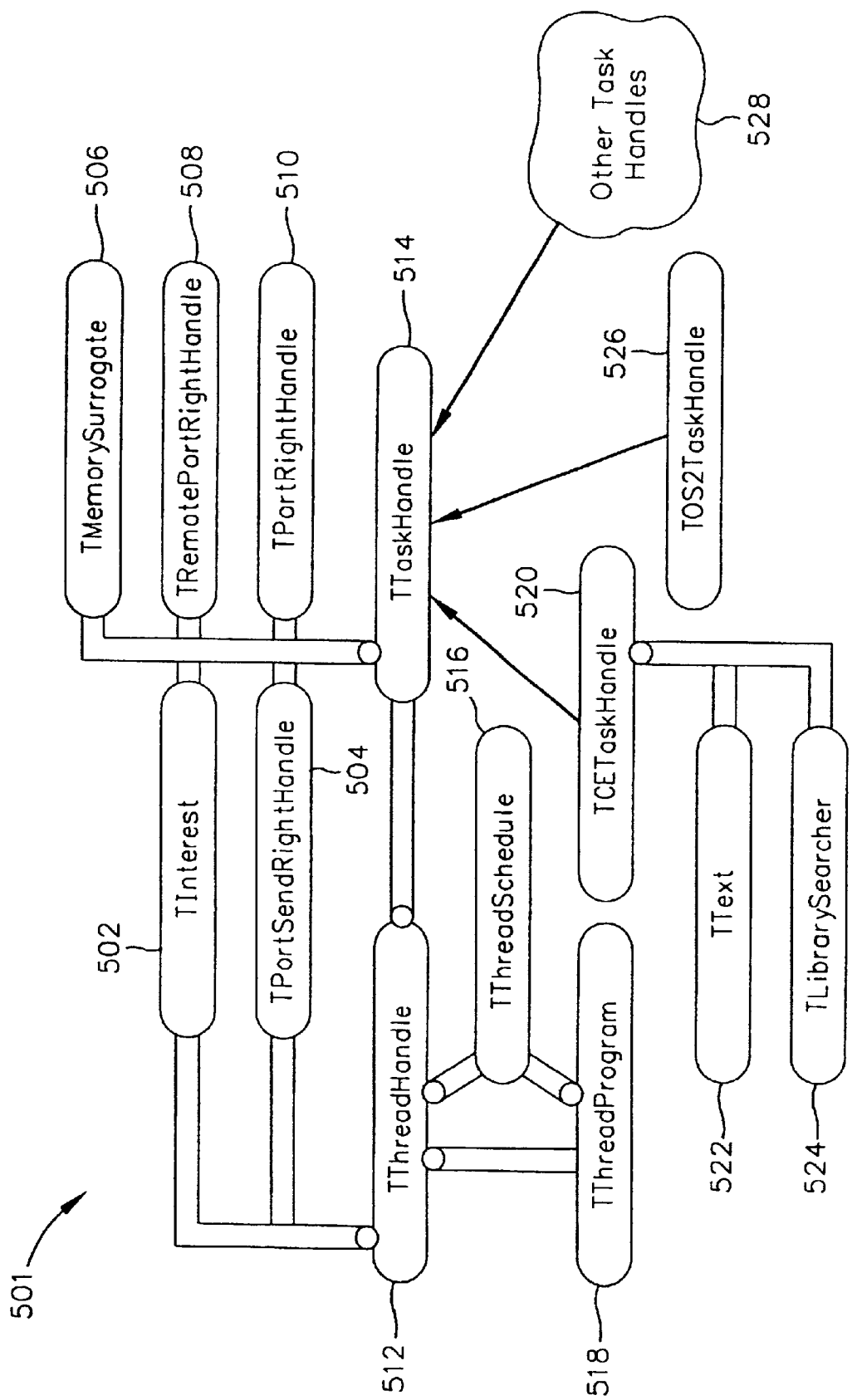
FIG. 5 is a class diagram of thread and task classes of the present invention.

FIG. 5 is a class diagram 501 of the thread classes 404 and the task classes 406. The thread classes 404 provide an object-oriented interface to the tasking and threading functionality of Mach 114. A number of the thread classes 404 are handle classes (so noted by their name), which means that they represent a reference to the corresponding kernel entity. The null constructors on the handle classes create an empty handle object. An empty handle object does not initially correspond to any kernel entity—it must be initialized via streaming, an assignment, or a copy operation. Calling methods on an empty handle will cause an exception to be thrown. Multiple copies of a handle object can be made, each of which point to the same kernel entity. The handle objects are internally reference-counted so that the kernel entity can be deleted when the last object representing it is destroyed.

TThreadHandle is a concrete class that represents a thread entity in the system. It provides the methods for controlling and determining information about the thread. It also provides the mechanism for spawning new threads in the system. Control operations include killing, suspending/resuming, and doing a death watch on it. Constructing a TThreadHandle and passing in a TThreadProgram object causes a new thread to be constructed on the current task. The first code run in the new thread are the Prepare( ) and Run( ) methods of the TThreadProgram object. Destroying a TThreadHandle does not destroy the thread it represents. There may also be a cancel operation on the TThreadHandle object. Note that each TThreadHandle object contains a send right to the control port for the thread. This information is not exported by the interface, in general, but because it does contain a port right the only stream object a TThreadProgram can be streamed into is a TIPCMessageStream. Attempting to stream into other TStream objects will cause an exception to be thrown.

TThreadHandle provides a number of methods for use by debuggers and the runtime environment, and for supporting interactions with Mach tasks running outside of the environment established by the wrapper 128. These methods include getting and setting the state of a thread, spawning an "empty" thread in another task, getting the thread's fault ports, returning a right to the thread's control port, and creating a TThreadHandle handle from a thread control port send right.

As noted above, the wrapper 128 establishes a computing environment in which the applications 130 operate. For brevity, this computing environment established by the wrapper 128 shall be called CE. With regard to the wrapper 128, TThreadHandle spawns a CE runtime thread on the current task. A thread can also be spawned on another task, instead of on the current task, by using the CreateThread methods in the TTaskHandle class and in subclasses of TTaskHandle. (Creating a thread on another task is not recommended as a general programming model, however.) To spawn a CE thread on another CE task, the TCETaskHandle::CreateThread method is used by passing it a TThreadProgram describing the thread to be run. To spawn a non-CE thread (that is, a thread which does not operate in the computing environment established by the wrapper 128), the CreateThread method is used on the appropriate subclass of TTaskHandle (that is, the subclass of TTaskHandle that has been created to operate with the other, non-CE computing environment). For example, to spawn an IBM OS2 thread on an OS2 task, you might use a TOS2- TaskHandle::CreateThread method. It is not possible to run a CE thread on a non-CE task, nor is it possible to run a non-CE thread on a CE task.

TThreadHandle includes the following methods:

TThreadHandle (const TThreadProgram& copyThreadCode): creates a new thread in the calling task—makes an internal COPY of the TThreadProgram, which is deleted upon termination of the thread.

TThreadHandle (TThreadProgram* adoptThreadCode): creates a new thread in the calling task—ADOPTs adoptThreadCode which is deleted upon termination of the thread. The resources owned by the thread are also discarded. A copy of the TThreadProgram is NOT made.

TThreadHandle (EExecution yourself) creates a thead handle for the calling thread.

TStream streams in a TThreadHandle object to a TIPCMessageStream.

CopyThreadSchedule ( ) returns a pointer to the Scheduling object (e.g., TServerSchedule, TUISchedule etc) that is used to schedule the object. Allocates memory for the TThreadSchedule object which has to be disposed of by the caller.

SetThreadSchedule (const TThreadSchedule& newSchedule) sets the scheduling object in the thread to the newSchedule object. This allows one to control the way a thread is scheduled GetScheduleState (TThreadHandle& theBlockedOnThread) allows one to query the current state of the thread (theBlockedOnThread) on which this thread is blocked.

CancelWaitAndPostException ( ) const causes a blocking kernel call to be unblocked and a TKernelException to be thrown in the thread (*this).

WaitForDeathOf ( ) const performs death watch on the thread—blocks calling thread until the thread (*this) terminates. CreateDeathInterest 0 creates a notification interest for the death of the thread (*this). When the thread terminates the specified TInterest gets a notification.

TThreadProgram is an abstract base class that encapsulates all the information required to create a new thread. This includes the code to be executed, scheduling information, and the thread's stack. To use, it must be subclassed and the Begin and Run methods overridden, and then an instantiation of the object passed into the constructor for TThreadHandle to spawn a thread. The Begin routine is provided to aid startup synchronization; Begin is executed in the new thread before the TThreadHandle constructor completes, and the Run routine is executed after the TThreadHandle constructor completes. The methods CopyThreadSchedule and GetStackSize return the default thread schedule and stack size. To provide values different from the default, these methods should be overridden to return the desired thread schedule and/or stack size. TThreadProgram includes the following methods:

TThreadProgram (const TText& taskDescription): TaskDescription provides a text description of a task that can be access via the TTaskHandle::GetTaskDescription method. Only in effect if the object is passed a TTaskHandle constructor. If default constructor is used instead, the interface will synthesize a unique name for TTaskHandle::GetTaskDescription to return.

GetStackSize ( ) returns the size of the stack to be set up for the thread. Override this method if you don't want the "default" stack size.

GetStack ( ): Used to set up the thread's stack. Override this method if you want to provide your own stack.

Run ( ) represents the entry point for the code to be run in the thread. OVERRIDE THIS METHOD to provide the code the thread is to execute.

Task Classes

See FIG. 5 for a class diagram of the task classes 406.

TTaskHandle is a concrete base class that encapsulates all the attributes and operations of a basic Mach task. It can be used to refer to and control any task on the system. TTaskHandle cannot be used directly to create a task, however, because it doesn't have any knowledge about any runtime environment. It does provide sufficient protocol, via protected methods, for subclasses with specific runtime knowledge to be created that can spawn tasks (TCETaskHandle, below, is an example of such a class). TTaskHandle objects can only be streamed into and out of TIPCMessageStreams and sent via IPC to other tasks, and they are returned in a collection associated with TCETaskHandle. The task control operations associated with a TTaskHandle include killing the task, suspending and resuming the task, and doing a deathwatch on the task. The informational methods include getting its host, getting and setting its registered ports, enumerating its ports or virtual memory regions, getting its fault ports, enumerating its threads, etc. TTaskHandle includes the following methods:

TTaskHandle (EExecutionThread) creates a task handle for the specified thread.

Suspend ( ) suspends the task (i.e., all threads contained by the task). Resume ( ) resumes the task (i.e., all threads contained by the task).

Kill ( ) terminates the task—all threads contained by the task are terminated.

WaitForDeathOf ( ) performs death watch on the task— The calling thread blocks until the task (*this) terminates. CreateDeathInterest ( ) creates a notification interest for the death of the task. The thread specified in the TInterest object gets a notification when the task (*this) terminates.

AllocateMemory (size_t howManyBytes, TMemorySurrogate& newRange) allocates a range of (anonymous) virtual memory anywhere in the task's address space. The desired size in bytes is specified in howManyBytes. The starting address (after page alignment) and actual size of the newly allocated memory are returned in newRange.

AllocateReservedAddressMemory (const TMemorySurrogate& range, TMemorySurrogate& newRange) allocates a range of (anonymous) virtual memory at a specified reserved address in the task's address space. The range argument specifies the address and size of the request. The newRange returns the page aligned address and size of the allocated memory.

GetRemotePorts (TCollection<TRemotePortRightHandle>& thePortSet) gets list of ports on *this task. The caller is responsible for de-allocating the memory in the returned Collection. virtual void CreateFaultAssociationCollection (TCollection<FaultAssociation>& where) return Fault Ports registered for this Task.

TCETaskHandle is a subclass of TTaskHandle that represents a Mach task executing with the CE runtime system (recall that that CE represents the computing environment established by the wrapper 128), and embodies all the knowledge required to set up the CE object environment. It can be used to spawn a new task by passing a TThreadProgram into its constructor. The new task is created with a single thread, which is described by the TThreadProgram object passed into the TCETaskHandle constructor. There is also a constructor that will allow a TCETaskHandle to be constructed from a TTaskHandle. To insure that a non-CE-runtime task is not wrapped with a TCETaskHandle, the constructor consults the CE loader/library server (that is, the loader/library server operating in the CE environment) to make sure the task being wrapped has been registered with it. This is done automatically (without any user intervention). TCETaskHandle includes the following methods:

TCETaskHandle (const TThreadProgram& whatToRun) creates a new task and a thread to execute specified code. The new thread executes the code in 'whatToRun'.

TCETaskHandle (EExecutionTask) wraps task of currently executing thread.

CETaskHandle (const TThreadProgram& whatToRun, const TOrderedCollection<TLibrarySearcher>& librarySearchers) creates a new task and a thread to execute specified code with specified ibrary search. The librarysearchers specifies the list of libraries to be used for resolving names.

TCETaskHandle (const TTaskHandle& aTask) creates a CE task object from a generic task object.

AddLibrarySearcher (const TLibrarySearcher& newLibSearcher) adds a library searcher for the task— loader uses newLibrarySearcher first to resolve lib references i.e. the newLibrarySearcher is put on the top of the collection used to resolve references.

GetTaskDescription (TText& description) const returns a string description of the task—gets the string from the associated TThreadProgram of the root thread (passed to constructor). The string is guaranteed to be unique, and a string will be synthesized by the interface if no description is passed to the TThreadProgram constructor.

NotifyUponCreation (TInterest* notifyMe) synchronously notifies the caller of every new task creation in the system. There is no (*this) task object involved. The task from which this call originates is the receiver of the notification.

Virtual Memory Classes

Figure 6:
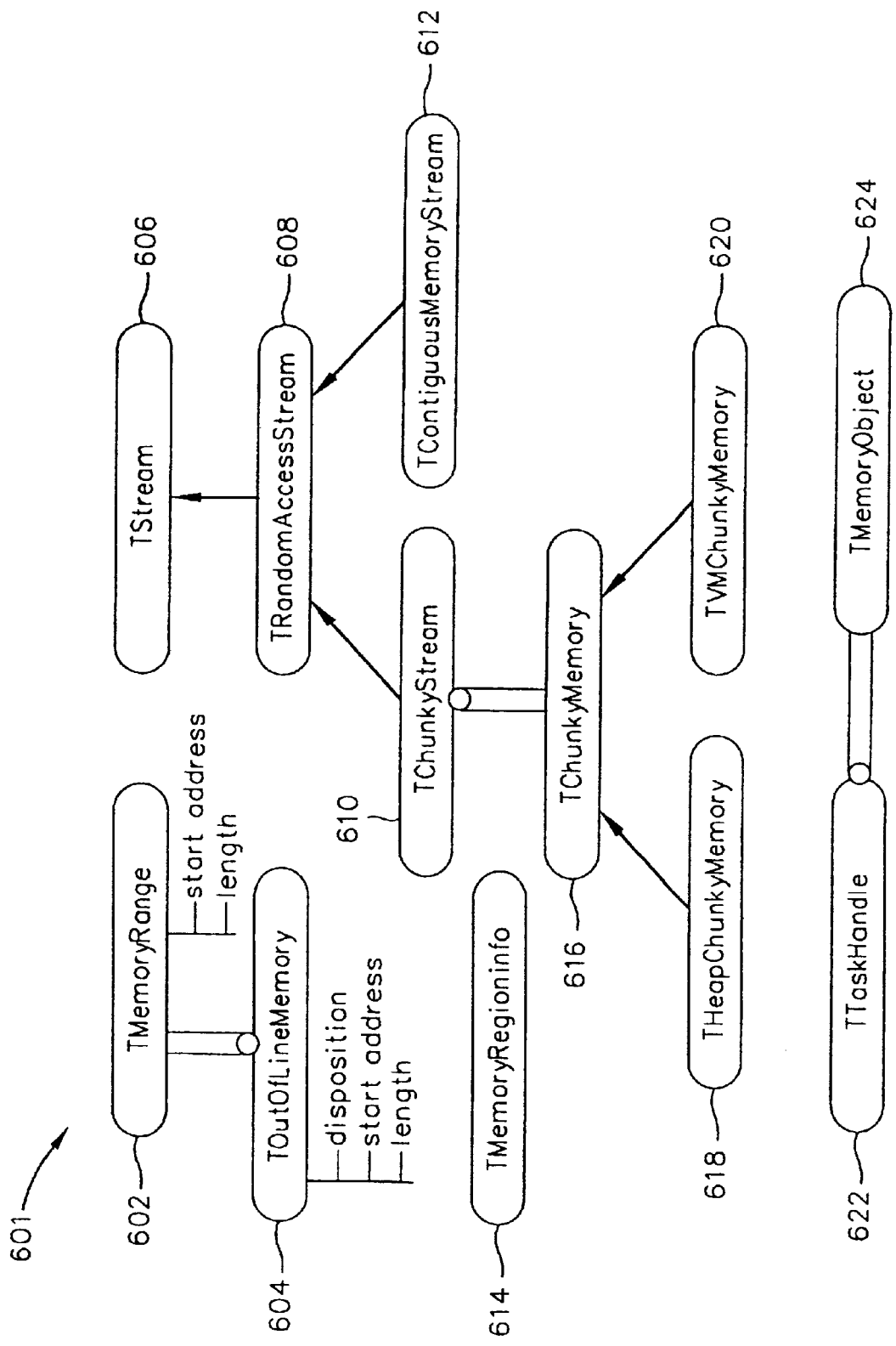
FIG. 6 is a class diagram of virtual memory classes of the present invention.

FIG. 6 is a class diagram 601 for the virtual memory classes 408. Note that TTaskHandle is a class that represents a task. TTaskHandle has already been discussed under the Task classes 406 section. For virtual memory operations, objects of type TTaskHandle serve to specify the address space in which the operation is to occur. Most of the virtual memory operations that can be performed in Mach are represented as methods of TTaskHandle. The various methods of TTaskHandle that operate on virtual memory take TMemorySurrogate objects as parameters. See the various methods under the TTaskHandle description for further details. A number of the memory classes have copy constructors and/or assignment operators. It should be noted that the memory classes contain references to the memory and not the actual memory itself. Therefore when memory class objects are copied or streamed, only the references within them are copied and not the actual memory. The TMemorySurrogate class contains explicit methods for doing copies of the memory it references.

TMemorySurrogate is a class that represents a contiguous range of memory in the virtual address space. It has a starting address and a size (in bytes). TMemorySurrogates can be used to specify ranges of memory on which certain operations are to be performed. They are typically supplied as arguments to methods of TTaskHandle that manipulate the virtual memory in the address space associated with the task. This class is used to specify/supply a region of memory with a specific size. The class itself does not allocate any memory. It just encapsulates existing memory. It is the responsibility of the caller to provide the actual memory specified in this class (the argument to the constructor). This class is NOT subclassable.

TChunkyMemory is an abstract base class that manages memory in chunks of a specified size. Memory is allocated in chunks (of the specified chunkSize), but the user still views the memory as a series of bytes. TChunkyMemory includes the following methods:

LocateChunk (size.sub.13 t where, TMemorySurrogate& theContainingRange) looks up in the collection of chunks and returns in theContainingRange the address of the memory and the chunksize.

CutBackTo (size.sub.13 t where) cuts back to the chunk containing "where" i.e. the chunk at the offset where will become the last chunk in the list.

AllocateMemoryChunk (TMemorySurrogate& theAllocatedRange) is called by clients to allocate new chunks of memory as needed. Returns the allocated range.

THeapChunkyMemory is a concrete class that manages chunky memory on a heap.

TVMChunkymemory is a concrete class that manages chunky memory using virtual memory.

TMemoryRegionInfo is a class used with virtual memory regions in a task's address space. It provides memory attribute information (like Inheritance, Protection etc.). It also provides access to the memory object associated with the region of memory and to the actual memory range encapsulated in the memory region. Nested inside TMemoryRegionInfo is the TMemoryAttributeBundle class that defines all the memory attributes of any memory region. This is useful when one wants to get/set all the memory attributes (or to re-use memory attributes with minimal changes). TMemoryAttributeBundle is also used in the class TTaskHandle to deal with mapping memory objects into a task's address space. TMemoryRegionInfo includes the following methods:

EMemoryProtection {kReadOnly, kReadWrite, kExecute} specifies the protection for the memory.

EMemoryInheritance {kDontInherit, kReadWriteInherit, kCopyInherit} specifies the inheritance attribute for the memory.

EMemoryBehavior {kReferenceSequential, kReferenceReverseSequential, kReferenceRandom} specifies how memory might be referenced.

EMemoryAttribute {kCacheable, kMigrateable} specifies how machine specific properties of memory might be managed.

EMemoryAdvice {kWillUse, kWontUse} specifies how memory will be used.

TMemoryObjectHandle is a base class that represents the notion of a Mach memory object. It embodies the piece of data that can be mapped into virtual memory. System servers that provide TMemoryObjectHandles to clients will subclass from TMemoryObjectHandle in order to define specific types of memory objects such as files, device partitions, etc. For the client of general virtual memory services, the main use of TMemoryObjectHandle and the various subclasses is to provide a common type and protocol for data that can be mapped into a task's address space.

TChunkyStream is a concrete class (derived from TRandomAccessStream) that embodies a random access stream backed by chunks of memory. The chunk size can be specified or a default used. The chunks can be enumerated. This class provides a common function of theTMemory class without incurring the overhead of maintaining the memory as contiguous. If the remaining functionality of TMemory is required other classes could be defined.

TContiguousMemoryStream is a concrete class that uses contiguous memory (supplied by the client). Since it is derived from TRandomAccessStream, all random access operations (like Seek( )) are applicable to TContiguousMemoryStream objects.

InterProcess Communication (IPC) Classes

Figure 7:
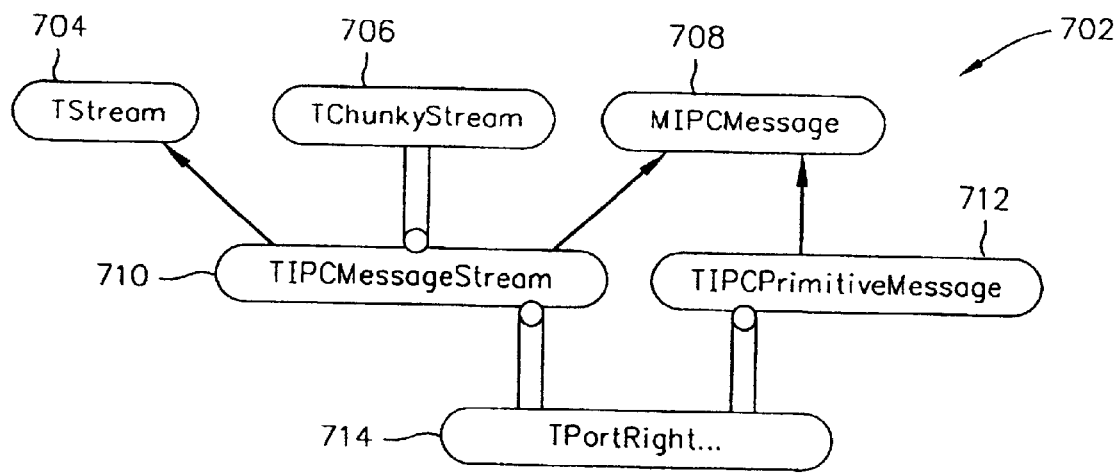
FIGS. 7–9 are class diagrams of interprocess communication classes of the present invention.
Figure 8:
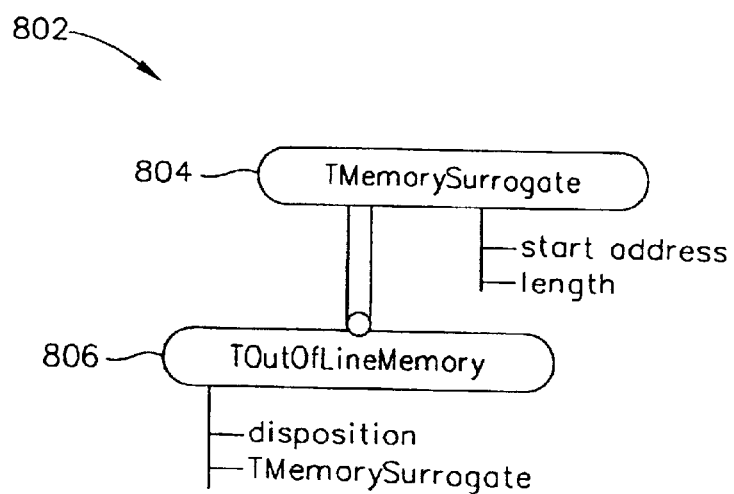
Figure 9:
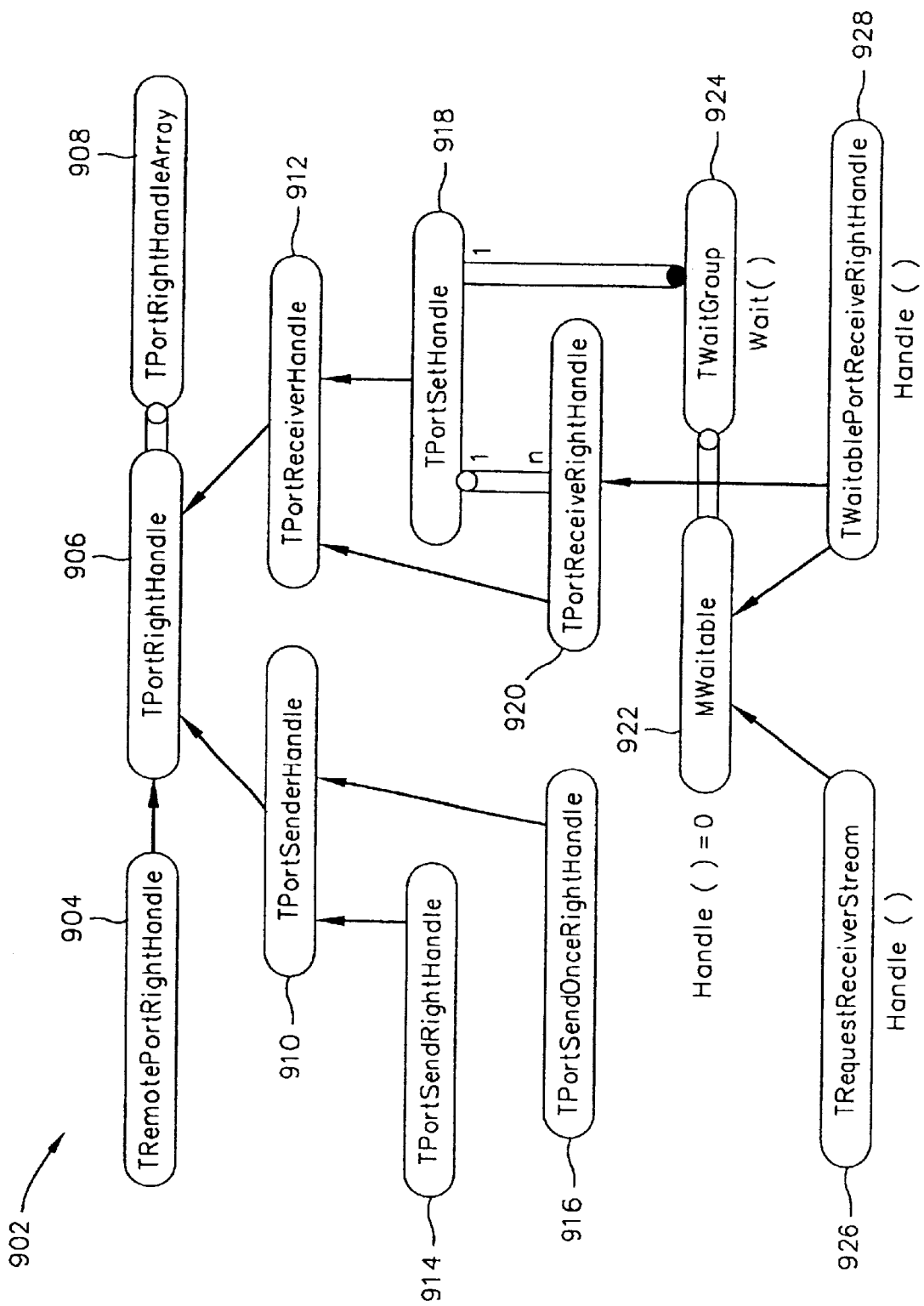

The IPC classes 410 represent the Mach IPC message abstraction. Note that all messaging behavior is on the message classes; the port right classes are basically for addressing the message. The usage model is preferably as follows: A TIPCMessageStream is instantiated, objects are streamed into it, and the TIPCMessageStream::Send method is called with an object representing a destination send-right passed as an argument. To receive a message, a TIPCMessageStream is instantiated and its Receive method called, passing in a receive-right object as an argument. When the Receive returns, objects can be streamed out of the TIPC-MessageStream object. Note that the TIPCMessageStream objects are reusable. A more detailed description of the IPC classes 410 follow with reference to FIG. 7,which illustrates a class diagram 702 of IPC message classes, FIG. 8 which illustrates a class diagram 802 of IPC out-of-line memory region classes, and FIG. 9 which illustrates a class diagram 902 of IPC port right classes.

Message Classes

MIPCMessage is an abstract base class that represents a Mach IPC message. It provides all the methods for setting up the fields of the header, the disposition array, and the port and out-of-line memory arrays. It also contains all the protocol for message sending and receiving. It provides rudimentary protocol (exported as a protected interface) to child classes for setting up the in-line message data. The classes TIPCMessageStream and TIPCPrimitiveMessage derive from this class, and provide the public methods for adding data to the message. MIPCMessage includes the following methods:

GetReplyPort (TPortSendSideHandle& replyPort) is valid for receive side only. Returns a reply port object, if one was sent with the message. Only returns it the first time this is called after message is received. Otherwise returns false.

TSecurityToken GetSendersSecurityToken( ) is valid for receive side only. Returns the security token of the task that sent this message.

SetSendersSecurityToken(const TSecurityToken& impostorSecurityToken,const TPortSendRight& hostSecurityPort) is valid for send side only. The next time the message is sent, it will carry the specified security token instead of the one for the task that actually does the send. Takes effect ONLY FOR THE NEXT SEND, and then reverts back to the actual sender's security token value.

Methods for sending/receiving IPC messages (Note that all these methods have an optional TTime timeout value. If you don't want a timeout, specify kPositiveInfinity. All these methods replace any existing value for reply port in msg header. For those methods that allow specification of a reply port, the disposition of the reply port right, as well as the port right itself, is passed via a MIPCMessage::TReplyPortDisposition object. This is the only way to set the reply port, since the disposition state is only valid for the duration of the send. Objects for port rights whose dispositions are MOVE become invalid once the send takes place.):

Send (const TPortSendSideHandle& destinationport, const TTime& timeout=kpositiveInfinity) is a one-way, asynchronous send.

Send (const TPortSendSideHandle& destinationPort, const TReplyPortDisposition& replyPort, const TTime& timeout=kPositiveInfinity) is an asynchronous send, with send (-once) reply port specified.

Receive (const TPortReceiveSideHandle& sourcePort, const TTime& timeout=kPositiveInfinity) is a "blocking" receive.

SendAndReceive (const TPortSendSideHandle& sendPort, const TPortReceiveSideHandle& receivePort, const TTime& timeout=kPositiveInfinity) sends a message, blocks and receives a reply (reply port is a send-once right constructed from receivePort).

SendAndReceive (const TPortSendSideHandle& sendPort, const TPortReceiveSideHandle& receivePort, MIPCMessage& receiveMsg, const TTime& timeout= kPositiveInfinity) send message, block and receive reply (reply port is a send-once right constructed from receiveport). Message is received into a new message object to avoid overwrite.

ReplyAndReceive (const TPortSendSideHandle& replyToPort, const TPortReceiveSideHandle& receivePort, const TTime& timeout=kpositiveInfinity): sends back a reply, blocks and receives a new message.

ReplyAndReceive (const TPortSendSideHandle& replyToPort, const TPortReceiveSideHandle& receivePort, MIPCMessage& receiveMsg, const TTime& timeout= kPositiveInfinity) sends back a reply, blocks and receives a new message.

Subclasses' methods for getting/setting port right fields in header (Remote and Local Ports: On SEND side, REMOTE PORT specifies the destination port, and LOCAL PORT specifies the reply port. On RECEIVE side, REMOTE PORT specifies the reply port (port to be replied to) and LOCAL PORT specifies the port received from. The way the port was (or is to be) transmitted is returned in theDisposition. It can have values: MACH_MSG_TYPE_(MOVE_ RECEIVE, MOVE_SEND, MOVE_SEND_ONCE, COPY_ SEND, MAKE_SEND, MAKE_SEND_ONCE}.):

GetRemotePort: pass in the remote port right, and specify the disposition.

PORT RIGHT Methods:

MovePortRightDescriptor: sender is giving away the port right to the destination. Works on Send, SendOnce, and Receive rights.

CopyPortSendRightDescriptor: sender is creating a copy of the send right at the destination.

MakePortSendRightDescriptor: a new send right will be created at the destination.

MakePortSendOnceRightDescriptor: a new send once right will be created at the destination.

TIPCMessageStream is a concrete class that provides a stream-based IPC messaging abstraction. This is the recommended class to be used for IPC operations. It derives from MIPCMessageDescriptor and from TStream. To send a message, a user of TIPCMessageStream streams in the data to be sent, including port-rights (TPortRightHandle derivatives), out-of-line memory regions (TOutOfLineMemorySurrogate), port-right arrays (TPortRightHandleArray), objects containing any or all of these, and any other object or data type desired.

TIPCMessageStream will automatically set up the appropriate data structures for the port rights, port right arrays, and out-of-line memory in the message header, and put a place holder in the stream so that these elements will be streamed out of the message in the appropriate place in the stream. Once the data has been streamed in, the message is sent using the Send method, supplying the appropriate destination port right (TPortSenderHandle) and optionally a reply port. To receive a message, the Receive method is called, supplying a receive right (TPortReceiverHandle) for the port to be received from. The data just received can then streamed out of the TIPCMessageStream.

TIPCMessageStream also provides two methods for doing a combined send and receive operation, designed to provide commonly-used message transmission semantics (and to take advantage of fast-paths in the Mach microkernel). SendAndReceive does a client-side synchronous-style send and then blocks in a receive to pick up the reply message. ReplyAndReceive does a server-side send of (presumably) a reply message and then immediately blocks in a receive awaiting the next request. Both calls require that a destination port and a receive port be specified. Additionally, the SendAndReceive method automatically creates the appropriate send-once right from the supplied receive right and passes it along as the reply port.

TIPCPrimitiveMessage is a concrete class that derives from MIPCMessage and provides a more rudimentary, low level interface to the Mach message system. Data is provided to and from the message header and body via get and set calls. There is no streaming capability. This is a concrete class that represents a Mach IPC message. In-line data is added to the message by passing in a TMemorySurrogate. Port rights, arrays, and OOLdata must be added and extracted explicitly using the appropriate methods.

TOutOfLineMemorySurrogate represents an out-of-line memory range that is to be included in an IPC message. It uses TMemorySurrogate in its implementation, and only adds disposition information to the startaddress and length information already contained in TMemorySurrogate. This class is the same as a TMemorySurrogate, except it indudes disposition information used when sending the message, and may represent the storage associated with the range. This class includes streaming operators, methods to set/get the range, and methods to set/get disposition information.

Port Rights

The following classes represent all the valid types of Mach port rights. These classes all share the following general behaviors: In general, when a port right object is instantiated it increments the kernel's reference count for that right, and when a port right object is destroyed it decrements the kernel's port right reference count. However, note that port right objects are handles for the "real" kernel port right entities. They can be copied, in which case there may be two objects that refer to the same kernel port right entity. These copies are reference counted internally so that when all the objects that refer to a port right are deleted, the kernel's port right reference count is decremented. When a port right becomes a dead name (i.e., when the port it belonged to is destroyed), attempts to use methods on the representative object will throw an exception (excluding those operations, like setting the reference counts, that are valid on dead names).

TPortRightHandle is an abstract base class that represents the notion of a port right. It contains all the protocol common to each type of port right, such as getting the port name, requesting dead name notification, testing to see if the port right is a dead name, etc. (The port name is returned as a mach_port_name_t type, and is provided as a way to interact with Mach servers not written using the object wrappers.) It also serves as a common super class to allow a generic type representing all types of ports to be passed polymorphically. TPortSenderHandle and TPortReceiverHandle derive from these classes. This class includes methods for streaming support (This class and any classes that contain it can only be streamed into or out of the TIPCMessageStream class. Attempting to stream into any other TStream will throw an exception at runtime.), Getters/Setters, and methods for requesting notifications (Must provide a send-once right that the notification is to be sent to. MAKE a send-once right by passing (by reference) a receive right. MOVE a send-once right by ADOPTING a send-once right.)

TPortSenderHandle is an abstract class that represents any port right that an IPC message can be sent to. E.g., this is the type that MIPCMessage::Send takes as the destination and reply ports. The classes TPortSendRightHandle and TPortSendOnceRightHandle derive from this class. This class includes methods for streaming support, and Getters and setters.

TPortSendRightHandle represents a port send right. It supports all the typical operations that can be performed on a send right. It is created by passing a valid TPortReceiveRightHandle or TPortSendRightHandle into the constructor, or by streaming it out of a TIPCMessageStrearn. This class includes methods that create an empty TPortSendRightHandle object without affecting the kernel reference counts, constructors that create a new Send Right in the current task, methods for Streaming Support, and Getters and setters.

TPortSendOnceRightHandle represents a port send-once right. It supports all the typical operations that can be performed on a send-once right. It is created by passing a valid TPortReceiveRightHandle into the constructor, or by streaming it out of a TIPCMessageStream. When a message is sent to an object of this class, making the send-once right invalid, all subsequent attempts to send to this object will cause an exception to be thrown. In addition, the object will be marked as invalid and attempts to use methods of the object will also cause exceptions to be thrown (except for methods for initializing the object, obviously). This class includes Constructors that create a TPortSendOnceRightHandle object without, Constructors that create a new Send Once right on the current task, methods for Streaming Support, and Getters and setters TPortReceiverHandle is an abstract class that represents any port right that an IPC message can be received from. E.g., this is the type that MIPCMessage::Receive takes as the port to receive from. The classes TPortRightReceiveHandle and TPortSetHandle derive from this class. This class includes methods for Streaming Support, and Getters and setters TPortReceiveRightHandle represents a port receive right. It supports all the typical operations that can be performed on a receive right, such as requesting no more-senders notification, setting and getting the port's maximum message size and queue length, getting and setting its make-send count, etc. If a TPortReceiveRightHandle is instantiated (other than with the null or copy constructors) it causes a port and receive right to be created. The copy constructor creates another object (an alias) that references the same receive right. These objects are internally reference counted, such that when the last object referencing a particular receive right is destroyed, it destroys the receive right (and the port) it represents, causing all extant rights to that port to become dead names. This class is a concrete class that represents a port receive right. By definition, the actual kernel port entity is created when a receive right is created, and destroyed when a receive right is destroyed. Since this class is a handle, creation and destruction of the receive right is not necessarily tied to creation and deletion of a TPortReceiveRightHandle. For example, the default constructor does not actually create a receive right, but just an empty object. This class includes Constructors that create a TPortReceiveRightHandle object without creating a port or affecting the kernel reference counts, Constructors that create new Receive Rights and Ports, methods to make an uninitialized object valid, creating a receive right (and therefore a port) in the process, Streaming Support, Receive Right/Port manipulation methods, Getters and setters, and Methods for requesting notifications.

TPortSetHandle represents a port set. It has methods for adding, removing, and enumerating the TPortReceiveRightHandle objects representing the receive rights contained in the port set, methods for getting and setting its make send count, etc. If a TPortSetHandle is instantiated with a default constructor, it causes a port set to be created. If it is instantiated using the copy constructor, an alias is created for the same port set. When the last object representing a particular port set is deleted, it destroys the port set. This class cannot be streamed.

TPortRightHandleArray is a concrete class that represents an array of port rights that can be sent as an out-of-line descriptor in an IPC message. It can contain any kind of port right, and the disposition of the port right (i.e., how it is to be transferred to the target task) is specified for each port right in the array. This class implements an array of port rights that can be sent as an out-of-line descriptor in an IPC message (along with port rights and out-of-line memory). This class includes methods for Streaming Support, Methods to add elements to the array (SEND SIDE), and Methods to remove elements from the array (RECEIVE SIDE).

TRemotePortRightHandle is a concrete class that is used to refer to a port right in another task. It does not contain most of the usual port right methods, since it is not intended to be used to perform those types of functions but merely to act as a name or handle for the remote port right. Constructing this class DOES NOT create a port right—it only represents a port right that already exists in another task.

Wait Groups

MWaitable and TWaitGroup are classes that provide for message dispatching and the ability to wait for more than one type of message source at the same time. TWaitGroup is a class that provides the ability to set up a collection of objects derived from MWaitable such that a thread can use the Wait method to receive a message from any of the MWaitable objects. It also provides for automatic dispatching of the received message. Multi-Wait Operations are called repeatedly by a task to receive messages. They are multi thread safe so there can be more than one thread servicing messages. This class includes methods for manipulating the members of the TWaitGroup. For example, GetListOfWaitables returns a list of MWaitables in this group. MWaitable is an abstract base class that associates a port with an internal handler method (HandleIPCMessage). It also provides a common base class for collecting together via the TWaitGroup class Receive Rights and other classes based on Receive Rights TWaitablePortReceiveRightHandle is a convenience class that derives from both TPortReceiveRightHandle and MWaitable. It is an abstract base class whose subclasses can be added to a TWaitGroup to provide for multi-wait/dispatching of Mach message IPC with other MWaitable subclasses.

Synchronization Classes

Figure 10:
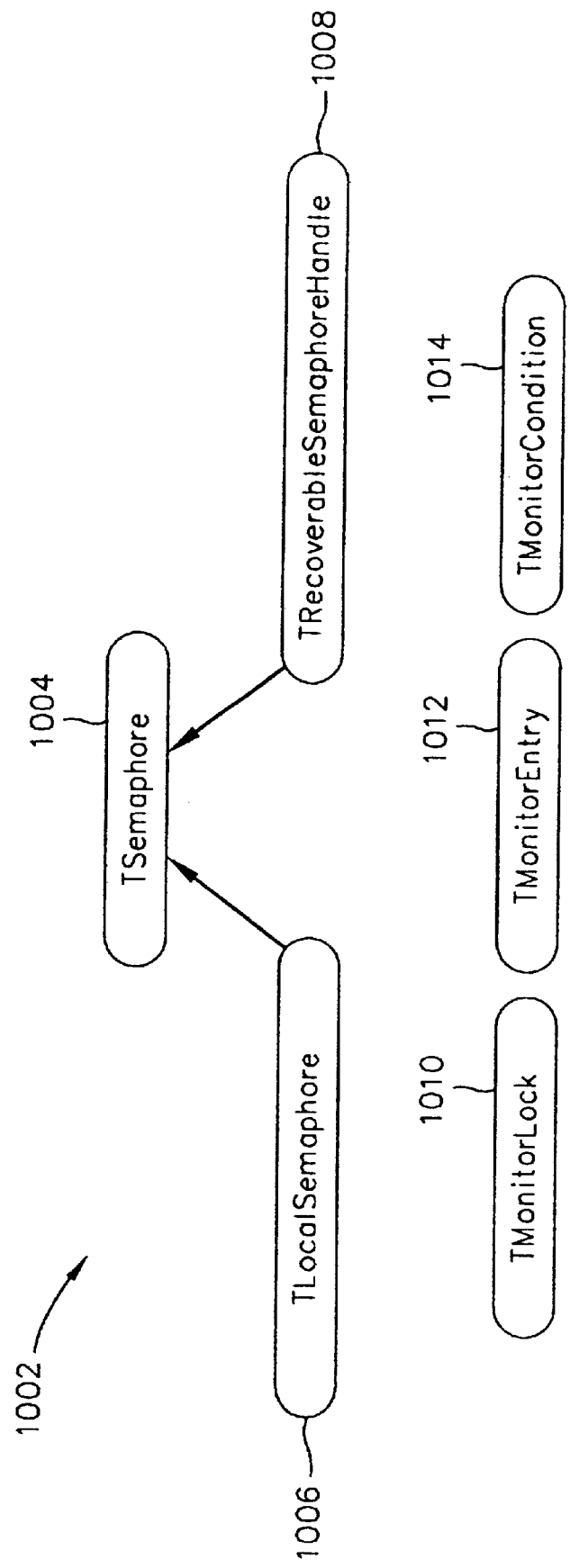
FIG. 10 is a class diagram of synchronization classes of the present invention.

FIG. 10 is a class diagram 1002 of the synchronization classes 412, which are used to invoke the synchronization services of Mach. As discussed above, the synchronization classes 412 employ semaphores and monitors and conditions. TSemaphore is a class that provides the general services of a counting semaphore. When acquiring a semaphore, if some other task already has acquired the semaphore, the calling thread blocks (no exception thrown). But if the semaphore is invalid for some reason, an exception is thrown. This class includes the following methods:

Acquire: acquire the semaphore in exclusive mode.

Acquire (const TTime& maximumWait): acquire the semaphore in exclusive mode, with time-out.

AcquireShared ( ): acquire the semaphore in shared mode.

AcquireShared (const TTime& maximumWait): acquire the semaphore in shared mode, with time-out.

Release ( ): release the previously acquired semaphore.

AnyThreadsWaiting ( ): returns true if the semaphore currently has threads waiting to acquire it.

TLocalSemaphore is a class that represents a counting semaphore that can be acquired in an exclusive or shared mode. The major operations are acquire and release. An optional time-out value can be specified on the acquire operation to limit the time spent waiting if desired. This class mplements local'semaphores, which may only be used within a task (address space) and have no recovery semantics.

TRecoverableSemaphoreHandle is a class that represents a semaphore that behaves like a TLocalSemaphore with the additional property that the semaphore is "recoverable". Recoverability means that when a thread holding the semaphore terminates abnormally, the counts are adjusted, and any waiting threads are appropriately unblocked. An exception is raised in each such thread indicating that the semaphore was recovered and the integrity of any associated user data may be suspect. Note that for abnormal termination of a thread that had acquired the semaphore in a shared fashion, no exceptions need be raised in other threads since the associated data should only have been accessed in a read-only fashion and should still be in a consistent state. This class includes the following methods:

GetCurrentHolders: returns a collection of the current threads holding the semaphore.

SetRecovered: sets state of the semaphore to 'recovered', removing a previous 'damaged' state.

Destroy: removes the recoverable semaphore from the system TMonitorEntry is a class that represents the lock (sometimes called a mutex) associated with a monitor. The constructor for this class actually causes the monitor lock to be acquired, and the act of exiting the local scope (which causes the destructor to be called) causes the monitor lock to be relinquished. If another task is already in the monitor, the thread attempting to enter the monitor will be blocked in the TMonitorEntry constructor until the preceding thread(s) leave the monitor. This class includes operators new and delete which are private so that TMonitorEntry's can only be allocated on the stack, thus providing automatic entry and exit (and the associated monitor lock acquire and release) with scope entry and exit.

TMonitorCondition is a class that represents a condition variable that is associated with some monitor. The major operations are wait, notify, and broadcast. The wait operation causes the current thread to wait for the condition to be notified, and while the thread is blocked the monitor lock is relinquished. Notify and broadcast are called by a thread executing inside the monitor to indicate that either one or all of the threads waiting on the condition should be unblocked when the notifying (or broadcasting) thread exits the monitor. When a waiting thread is unblocked, it attempts to reaquire the monitor lock (one thread at a time in the case of a broadcast), at which point it resumes executing in the monitor. An optional timeout value can be specified to limit the time spent waiting for a condition. Other than construction and destruction, all methods of TMonitorCondition must be called only from within the monitor.

TMonitorLock is a class that represents a lock on a monitor. It is passed into the constructors for TMonitorEntry and TMonitorCondition to indicate which monitor is being aquired or to which monitor a condition is to be associated.

Scheduling Classes

Figure 11:
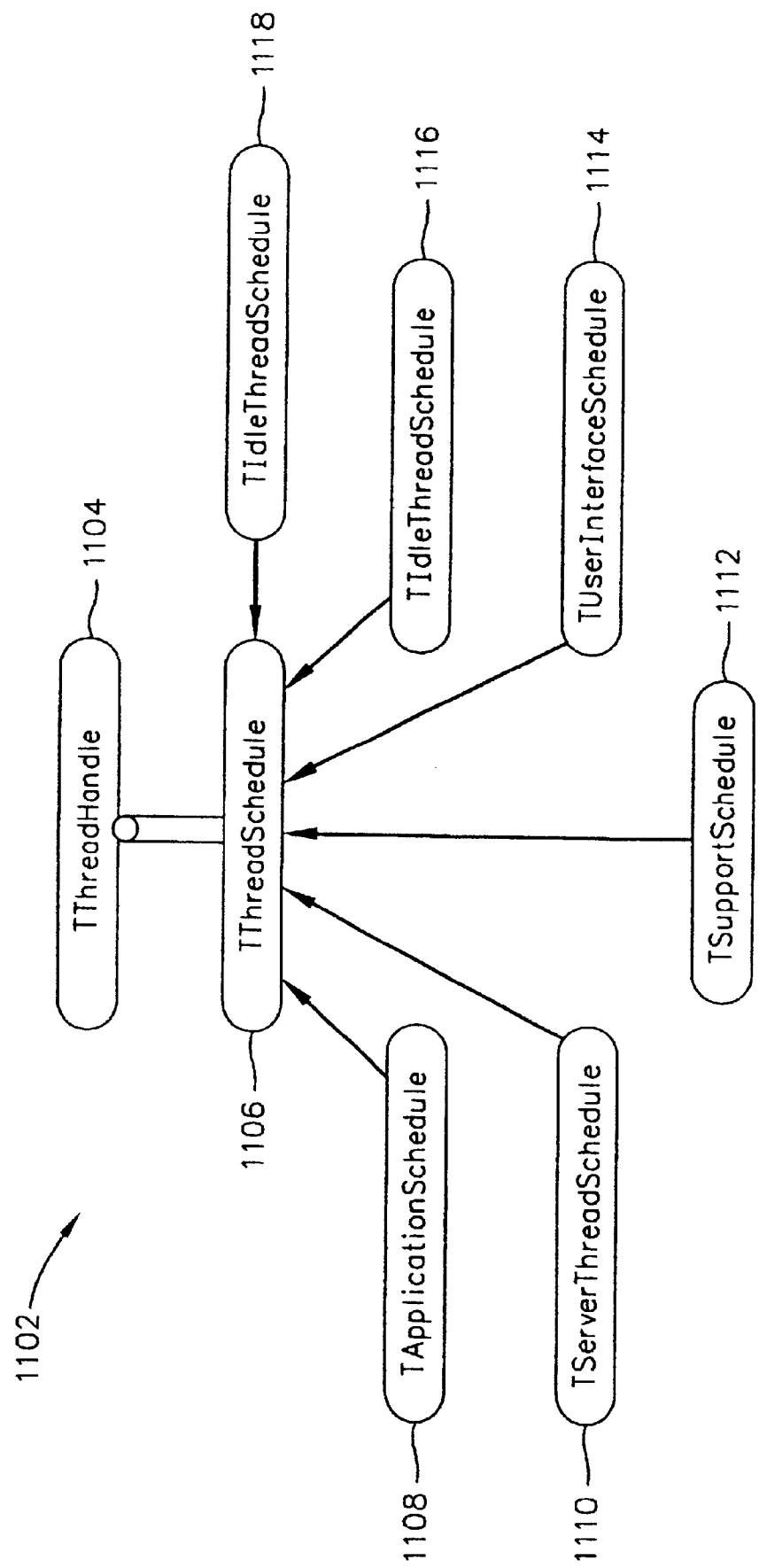
FIG. 11 is a class diagram of scheduling classes of the present invention.
Figure 12:
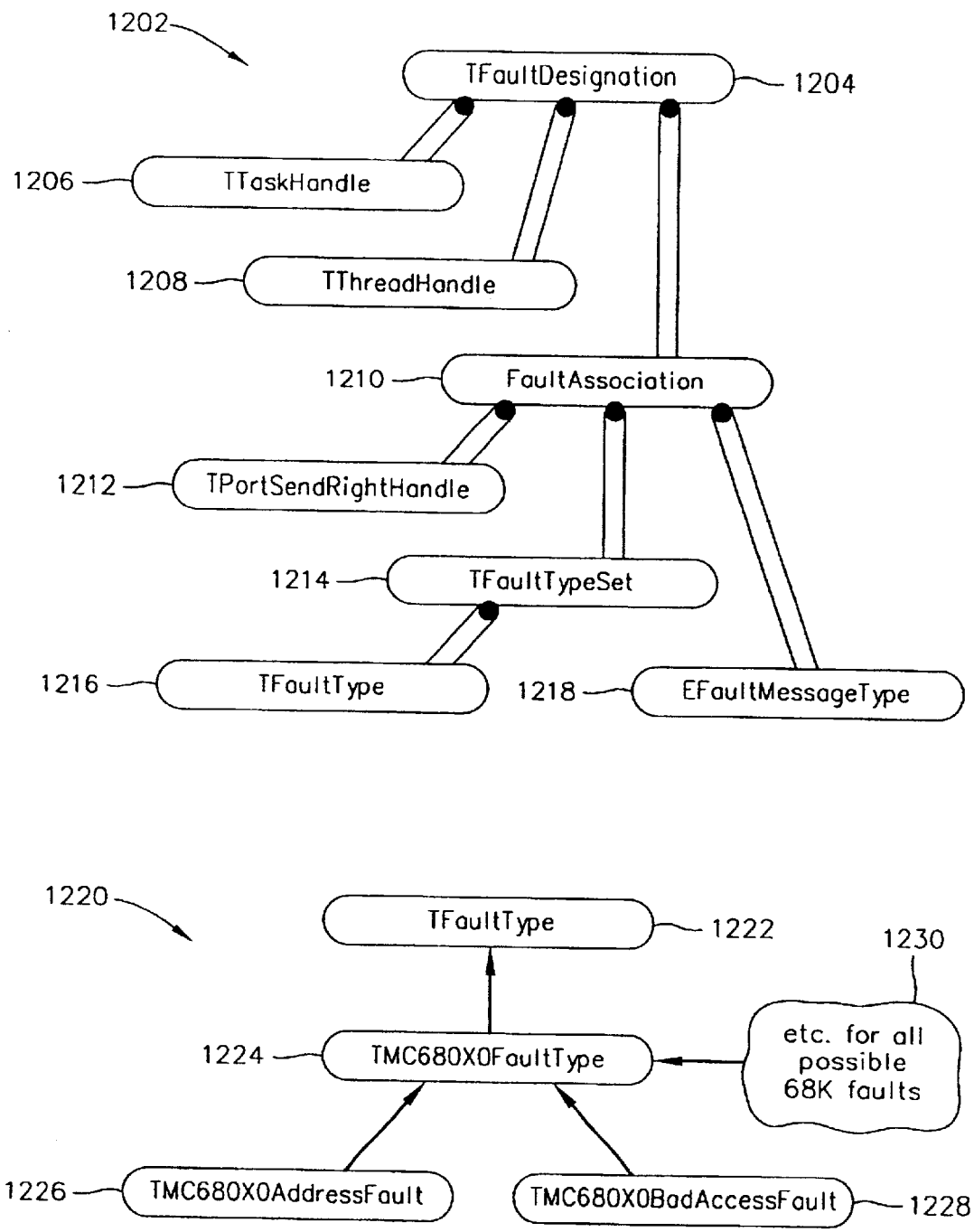
FIGS. 12–15 are class diagrams of fault classes of the present invention.
Figure 13:
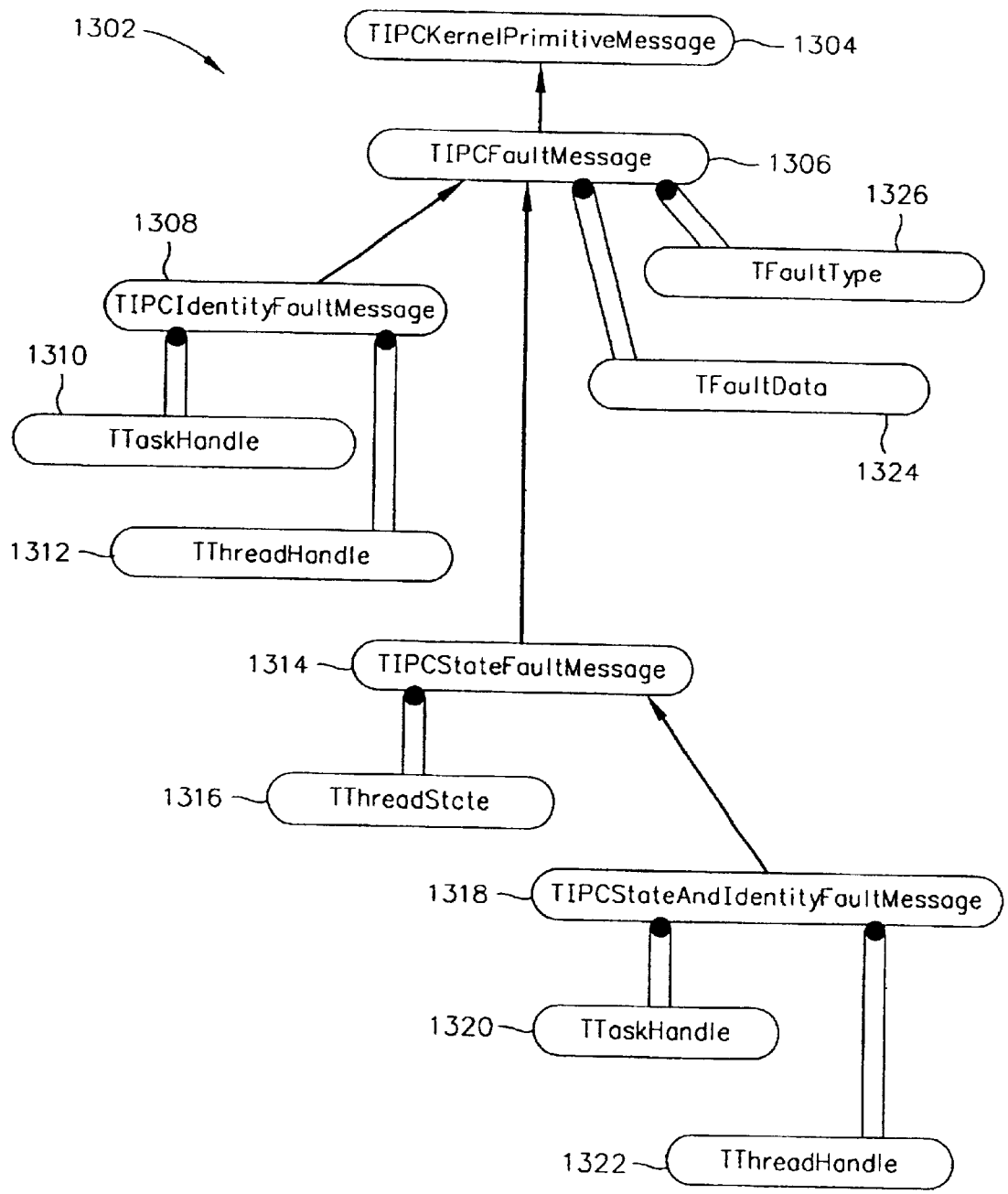
Figure 14:
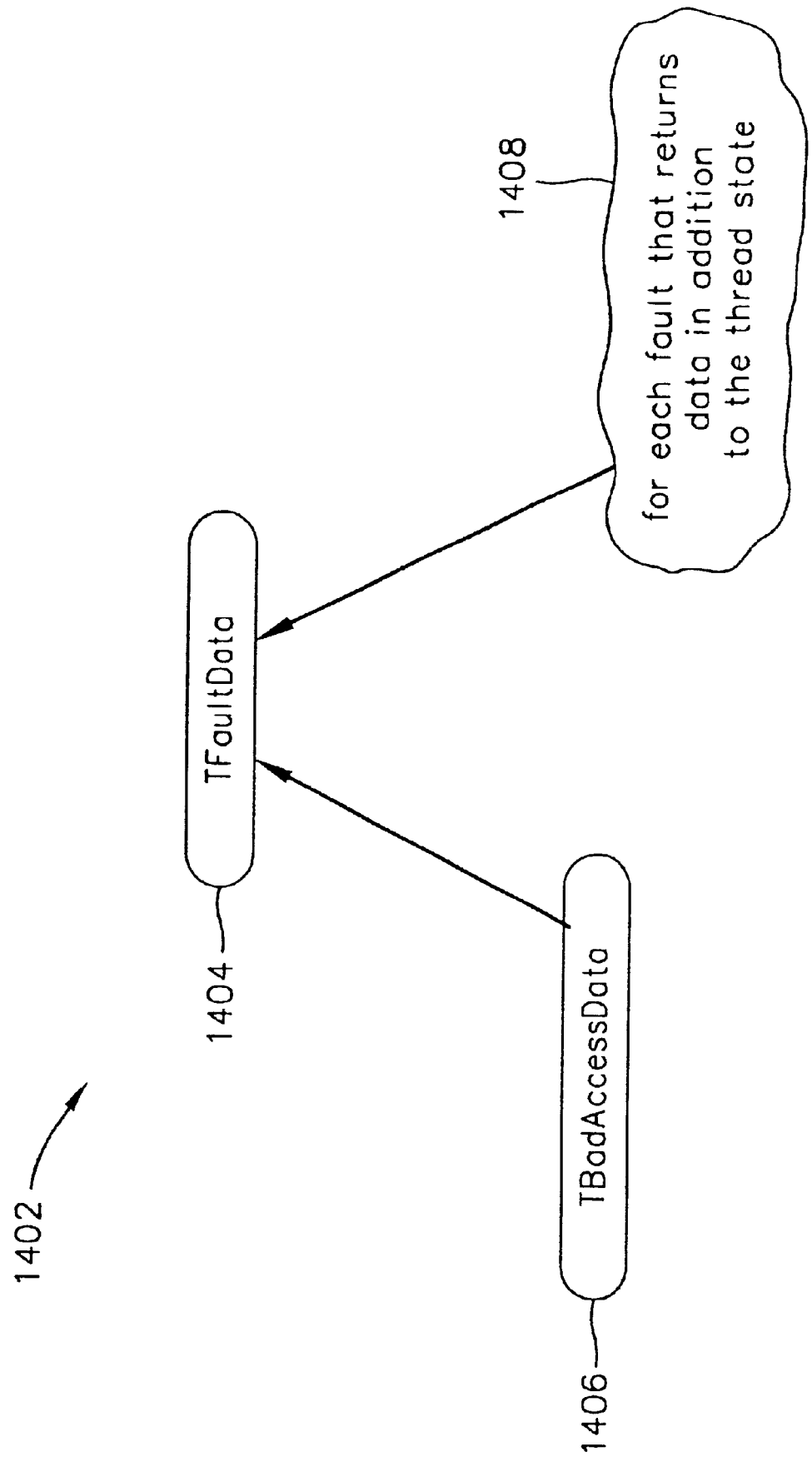
Figure 15:
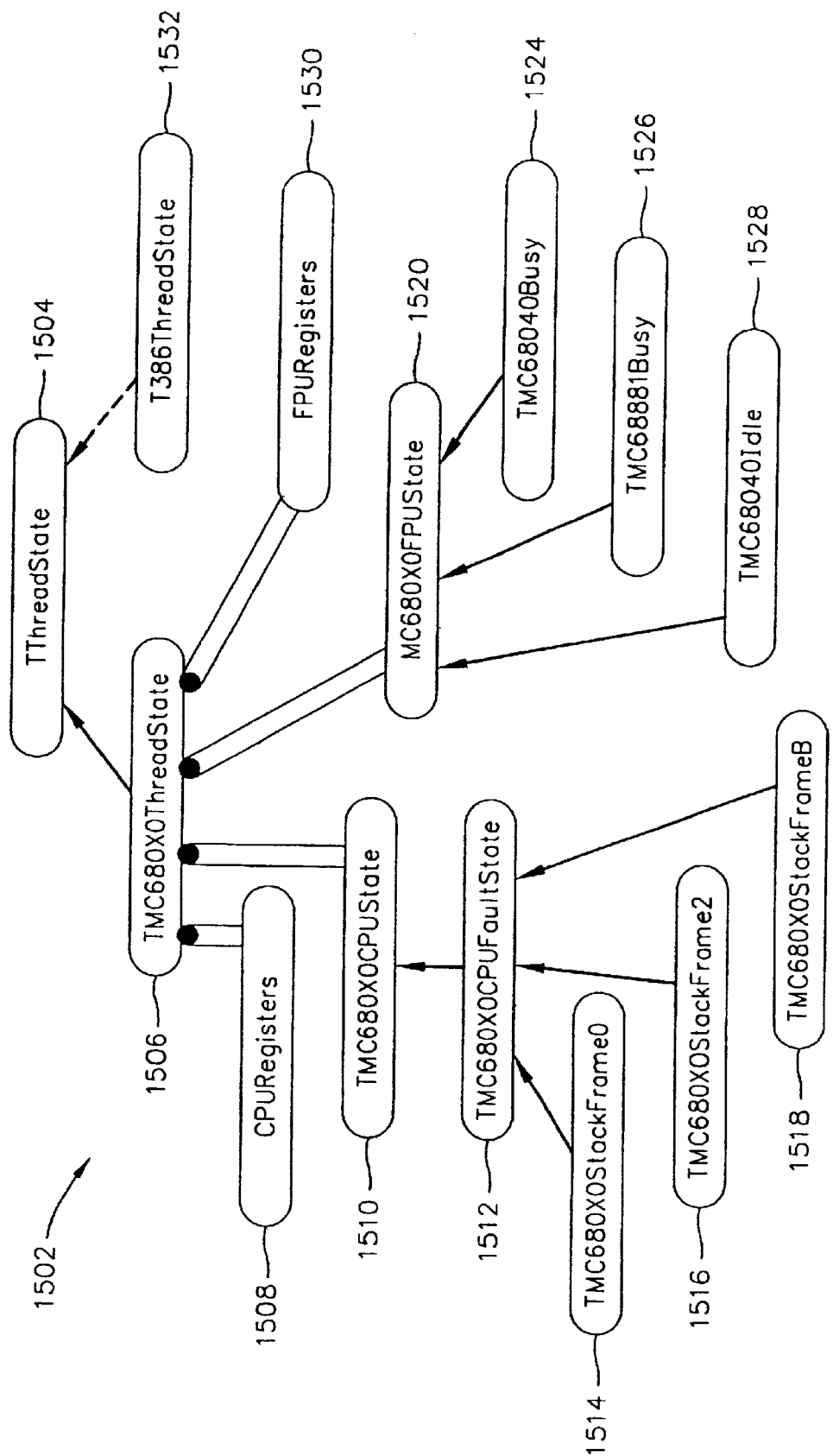

FIG. 11 is a class diagram 1102 of the scheduling classes 414, which are used to invoke the scheduling services of Mach.

TThreadSchedule is a concrete base class that embodies the scheduling behavior of a thread. It defines the thread's actual, default, and maximum priorities. The lower the priority value, the greater the urgency. Each processor set has a collection of enabled TThreadSchedules and a default one. A thread may be assigned any TThreadSchedule that is enabled on the processor set on which the thread is running. The priority may be set up to the maximum value defined by ThreadSchedule, but use of this feature is strongly discouraged. Specific scheduling classes (TIdleSchedule, TServerSchdule etc.) are made available using this class as the base. however (since there are no pure virtual functions in this class) derived classes are free to create objects of this class if necessary (but it may not be required to do so). TThreadSchedule objects (using polymorphism) are used to specify scheduling policy for threads. The subclasses presented below should be used to determine the appropriate priority and proper range.

TIdleThreadSchedule is a concrete subclass of TThreadSchedule for those threads that are to run when the system is idle. They only run when nothing else in the system can run. This category, in general, would be used for idle timing, maintenance, or diagnostic threads.

TServerSchedule is a concrete subclass of TThreadSchedule for server threads. Server threads must be very responsive. They are expected to execute for a short time and then block. For services that take an appreciable amount of time, helper tasks with a different kind of TThreadSchedule (TSupportSchedule) should be used.

TUserInterfaceSchedule is a concrete subclass of TThreadSchedule for those application tasks that should be responsive and handle the application's human interface. They typically run for a short time and then block until the next interaction.

TApplicationSchedule is a class used with those threads that support an application's longer running parts. Such threads run for appreciable amounts of time. When an application or window is activated, the threads in the associated task become more urgent so that the threads become more responsive.

TPseudoRealTimeThreadSchedule is a class that allows tasks to specify their relative urgency in the fixed priority class by setting their level within its range. The task schedule exports the number of levels that are allowable and the default base level. If a level is requested that would cause the value to be outside the class range an exception will be thrown. This class includes the following methods:

SetLevel (PriorityLevels theLevel): Set the level of the task. A lower number is more urgent.

ReturnNumberOfLevels ( ): Return the number of levels of urgency for this scheduling object.

ReturnDefaultLevel ( ): Return the default level of urgency for this scheduling object. The default level is relative to the scheduling class's most urgent priority.

Fault Classes

FIGS. 12, 13, 14, and 15 present class diagrams 1202, 1220, 1302, 1402, and 1502 of the fault classes 416, which are used to invoke the fault services of Mach. For the classes that represent fault messages (for example, TIPCIdentityFaultMessage, TIPCIdentityFaultMessage, etc.), it is necessary to dedicate a single port for each message type. That is, the user should ensure that only one type of message will be received on any given port that is used for fault handling. Preferbly, the fault classes 416 include a processor-specific set of classes for each processor 106 that the operating system 114 runs on. Alternatively, the fault classes 414 may include generally generic classes which apply to multiple processors. The Motorola-68000-specific classes are presented herein for illustrative purposes, and is not limiting. Persons skilled in the relevant art will find it apparent to generate processor-specific classes for other processors based on the teachings contained herein.

TFaultType is an abstract base class that represents a fault. It is subclassed to provide the processor-unique fault values. It identifies the fault by processor and fault id. The following three classes are subclasses of TFaultType:

TMC680X0FaultType represents a fault type on a Motorola 68K processor. It identifies the possible 68K type values and CPU descriptor.

TMC680X0BadAccessFaultType represents a bad access type on a Motorola 68K processor.

TMC680X0AddressFaultType represents an address error type on a Motorola 68K processor.

TFaultDesignation is a class that encapsulates the destination, the format for a fault message, and the types of faults for which the message should be sent for a task or thread. This class allows you to specify on a task or thread basis that the fault message of the requested type for the specified fault types should be sent to the port indicated by the send right.

TFaultTypeSet encapsulates a set of fault types.

TFaultData is a class that encapsulates fault data provided by the kernel in addition to the processor state. Not all faults have fault data. The fault data is provided in the fault message and is available from the thread state.

TIPCFaultMessage is a class that encapsulates the fault message sent by the kernel on behalf of the thread that got the Fault. It is used to receive and reply to the Fault. Three subclasses (below) are provided for the three possible kinds of data that might be sent with the fault message. The message may include the identification of the faulting task and thread, or the state of the faulting thread, or both sets of information. TIPCIdentityFaultMessage encapsulates the Fault message containing the identity of the thread that got the Fault. It is used to receive and reply to the Fault. TIPCStateFaultMessage encapsulates the Fault message containing the thread state of the thread that got the Fault. It is used to receive and reply to the Fault. TIPCStateAndIdentityFaultMessage encapsulates the Fault message containing the thread state and identity of the thread that got the Fault. It is used to receive and reply to the Fault.

TThreadState is an abstract class that represents the CPU state of a thread. Subclasses actually define the processor specific forms. There is no information in the class. All work is done in the derived classes. All queries for CPU state will return a TMC680X0State pointer which has to be cast at runtime to the correct derived class object. Derived subclasses are specific to particular processors, such as many of the subclasses shown in FIGS. 12, 13, 14, and 15 which are dependent on the Motorola 68xxx line of processors. Such subclasses include TMC680X0State, which is a concrete class that represents the 680x0 CPU state of a thread. Other examples include TMC680X0CPUState, which encapsulates the CPU state available for all 68K states, and TMC680X0CPUFaultState, which encapsulates the 68K fault state available for all 68K states.

Host and Processor Set Classes

Figure 16:
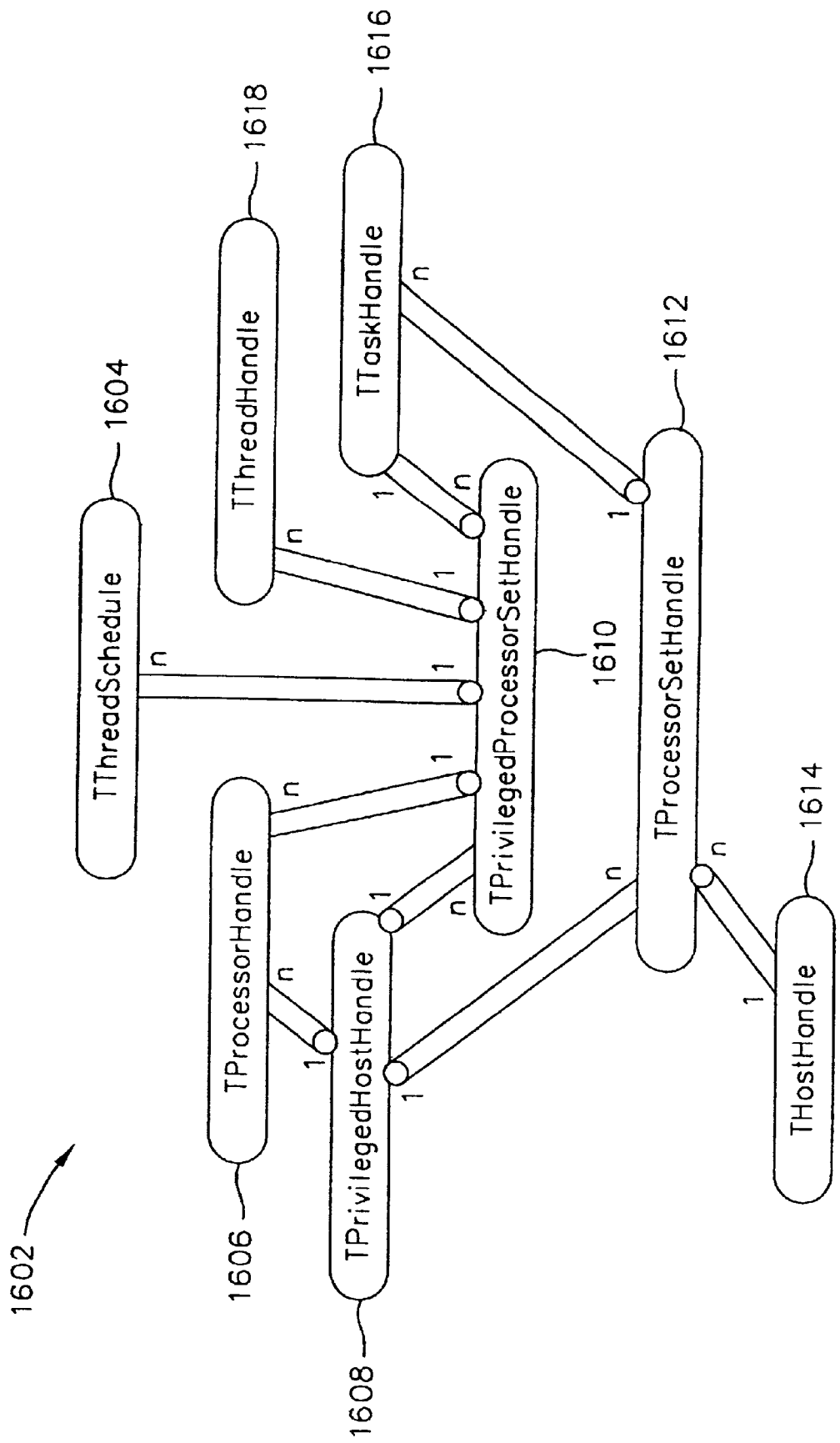
FIG. 16 is a class diagram of host and processor set (machine) classes of the present invention.

FIG. 16 is a class diagram 1602 for the machine classes 418, which are also called herein the host and processor set classes. The machine classes 418 are used to invoke the services related to Mach's machine and multiprocessor support.

TPrivilegedHostHandle is a concrete class that embodies the privileged port to the kernel's host object. The privileged host port is the root of Mach's processor management. The holder of the privileged host port can get access to any port on the system. The basic privilege mechanism provided by the kernel is restriction of privileged operations to tasks holding control ports. Therefore, the integrity of the system depends on the close holding of this privileged host port. Objects of this class can: get boot information and host statistics, reboot the system, enumerate the privileged processor sets, communicate with non-CE entities, and enumerate the processors.

THostHandle is a non-privileged concrete class that embodies the name port to the kernel's host object. Objects of this class can return some host information, and return the default processor set. Objects of this class are useful to get information from the host (such as kernel version, maximum number of CPUs, memory size, CPU type, etc.) but cannot cause any damage to the host. Users should be provided access to objects of this class rather than the highly privileged TPrivilegedHostHandle objects.

TProcessorHandle is a concrete class representing a processor. A processor can be started, exited, added to a TPrivilegedProcessorSetHandle, return information, and be sent implementation-dependent controls.

TPrivilegedProcessorSetHandle is a concrete class providing the protocol for a processor set control port. Objects of this class can: enable and disable scheduling policies, set the maximum priority for the processor set, return statistics and information, enumerate the tasks and threads, and assign threads and tasks to the processor set. Client access to objects of this class should be highly restricted to protect the individual processors and the processor set.

TProcessorSetHandle is a concrete class providing the protocol for a processor set name port. Objects of this class can return basic information about the processor set (the number of processors in the processor set, etc.) but they cannot cause any damage to the processor set.

Implementation of Wrapper Methods

As noted above, the Mach and the Mach procedural interface are well-known. The wrapper class library 402, and the operation of the methods of the wrapper class library 402, have been defined and described in detail above. Implementation of the methods defined by the wrapper class library 402 is described below by considering selected methods from the wrapper class library 402. Persons skilled in the relevant art will find it apparent to implement the other methods of the wrapper class library 402 based on the well-known specification of the Mach, the discussion above regarding the wrapper class library 402, and the discussion below regarding the implementation of the wrapper methods. The implementation of the kill( ) method from the TThreadHandle class of the thread classes 404 is shown in Code Example 2, below. A routine called "example1" is shown in Code Example 1, below. The "example1" routine includes a decomposition statement which causes the kill( ) method to be executed.

© Copyright, Taligent Inc., 1993

```
void example1(TThreadHandle& aThread)
{
    TRY
    {
        aThread.Kill( );      // terminates aThread immediatly
    }
    CATCH(TKernelException)
    (
        printf("Couldn't kill thread\n");  // error occured trying to kill
    }
    ENDTRY;
    // . . .
}
```
CODE EXAMPLE 1
```
void TThreadHandle::Kill( )
{
    kern_return_t error;
    if((error = thread_terminate(fThreadControlPort)) !=
    KERN_SUCCESS)
        THROW(TKernelException( ));    // Error indicator
}
```

CODE EXAMPLE 2

Where:

fThreadControlPort is an instance variable of the TThreadHandle class that contains the Mach thread control port for the thread the class represents.

TKernelException is the C++ exception class that is thrown when a kernel routine gets an error.

THROW, TRY, CATCH, and ENDTRY are part of the C++ language that allow you to throw and catch C++ exceptions.

The implementation of the suspend( ) method from the TTaskHandle class of the task classes 406 is shown in Code Example 4, below. A routine called "example2" is shown in Code Example 3, below. The "example2" routine includes a decomposition statement which causes the suspend( ) method to be executed.

```
void example2(TTaskHandle& aTask)
{
    TRY
    {
        aTask.Suspend( );     // suspend all threads on task aTask
    }
    CATCH(TKernelException)
    (
        printf("Couldn't suspend threads\n");   // error occured
    }
    ENDTRY;
    // . . .
}
```

CODE EXAMPLE 3

```
void TTaskHandle::Suspend( )
{
    kern_return_t error;
    if((error = task_suspend(fTaskControlPort)) != KERN_SUCCESS)
        THROW(TKernelException( ));    // Error indicator
}
```

CODE EXAMPLE 4

Where:

fTaskControlPort is an instance variable of the TTaskHandle class that contains the Mach thread control port for the task the class represents.

TKernelException is the C++ exception class that is thrown when a kernel routine gets an error.

THROW, TRY, CATCH, and ENDTRY are part of the C++ language that allow you to throw and catch C++ exceptions.

The implementation of the GetLevel( ) method from the TPseudoRealTimeThreadSchedule class of the scheduling classes 414 is shown in Code Example 6, below. A routine called "example3" is shown in Code Example 5, below. The "example3" routine includes a decomposition statement which causes the GetLevel( ) method to be executed.

```
void example3(TPseudoRealTimeThreadSchedule& aSchedule)
{
    PriorityLevels curPriority;
    curPriority = aSchedule.GetLevel ( );    // Get thread's current
                                                priority
    // . . .
}
```

CODE EXAMPLE 5

```
PriorityLevels TPseudoRealTimeThreadSchedule::GetLevel( )
{
    struct task_thread_sched_info schedInfo;
    thread_sched_info schedInfoPtr = schedInfo;
    mach_msg_type_number_t returnedSize;
    returnedSize = sizeof (schedInfo);
    void thread_info (fThreadControlPort, THREAD_SCHED_INFO,
        schedInfoPtr, &returnedSize);
    return (schedInfo.cur_priority);
}
```

CODE EXAMPLE 6

Where:

fThreadControlPort is an instance variable of the TPseudoRealTimeThreadSchedule class. It contains the Mach thread control port of the thread for which the class is a schedule.

The implementation of the GetKernelVersion( ) method from the THostHandle class of the machine classes 418 is shown in Code Example 8, below. A routine called 'example4" is shown in Code Example 7, below. The "example4" routine includes a decomposition statement which causes the GetKernelVersion( ) method to be executed.

```
void example4(THostHandle& aHost)
{
    kernel_version_t version;
    aHost.GetKernelVersion (&version);    // get version of kernel
                                             currently running
    // . . .
}
```

CODE EXAMPLE 7

```
void THostHandle::GetKernelVersion (kernel_version_t& theVersion)
{
    void host_kernel_version(fHostPort, theVersion);
}
```

CODE EXAMPLE 8

Where:
fHostPortis an instance variable of the THostHandleclass that contains the Mach host control port for the host the class represents.

The implementation of the GetMakeSendCount( ) method from the TPortReceiveRightHandle class of the IPC classes 410 is shown in Code Example 10, below. A routine called "example5" is shown in Code Example 9, below. The "example5" routine includes a decomposition statement which causes the GetMakeSendCount( ) method to be executed. As evident by its name, the GetMakeSendCount( ) method accesses the Mach to retrieve a make send count associated with a port. The GetMakeSendCount( ) method includes a statement to call mach_port_get_attributes, which is a Mach procedurally-oriented system call that returns status information about a port. In GetMakeSendCount( ), fTheTask is an instance variable of the TPortReceiveRightHandle object that contains the task control port of the associated task, and fThePortName is an instance variable of the TPortReceiveRightHandle object that contains the port right name of the port represented by the TPortReceiveRightHandle object.

```
void example5(TPortReceiveRightHandle& aReceiveRight)
{
    unsigned long count;
    count = aReceiveRight.GetMakeSendCount( );
    // . . .
}
```

CODE EXAMPLE 9

```
unsigned long TPortReceiveRightHandle::GetMakeSendCount( )
{
    mach_port_status_t theInfo;           // port status info
                                          returned by Mach
    mach_msg_type_number_t theSize;       // size of info returned by
    void mach_port_get_attributes(fTheTask, fThePortName,
                MACH_PORT_RECEIVE_STATUS,
    &theInfo, &theSize);
    return(theInfo.mps_mscount);
}
```

CODE EXAMPLE 10

Variations on the present invention will be obvious to persons skilled in the relevant art based on the discussion contained herein. For example, the scope of the present invention includes a system and method of enabling a procedural application to access in a procedural manner an object-oriented operating system having a native object oriented interface during run-time execution of the application in a computer. This embodiment of the present invention preferably operates by locating in the application a procedural statement which accesses a service provided by the operating system, and translating the procedural statement to an object-oriented function call (i.e., method) compatible with the native object-oriented interface of the operating system and corresponding to the procedural statement. The object-oriented function call is executed in the computer to thereby cause the operating system to provide the service on behalf of the application. While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A computer system for running object-oriented applications, comprising:
    a computer platform including a computer hardware and an operating system executable on the computer hardware;
    an object-oriented interface specifying object-oriented classes each containing one or more methods, the interface implemented on a plurality of different computer platforms including different combinations of computer hardware and operating systems, the interface used by object-oriented applications to instantiate objects from the classes and invoke the object oriented methods;
    a procedural program logic code, specific to the operating system, compiled for use on the computer hardware and responsive to the object-oriented interface to provide native system services from the computer platform;
    executable program memory in the computer hardware for runtime execution of the operating system, the object-oriented interface, and the procedural program logic code;
    logic to determine if object-oriented methods to be invoked during runtime execution are not present in the executable program memory; and
    a runtime loader for loading into the executable program memory object-oriented methods determined to not be present in the executable program memory prior to their runtime execution.

2. The computer system of claim 1, wherein the runtime loader further comprises:
    logic to load related portions of the procedural program logic code determined to not be present in the executable program memory prior to their runtime execution.

3. The computer system of claim 2, further comprising:
    logic to designate which object-oriented methods request native system services.

4. The computer system of claim 2, wherein the operating system further comprises:
    an operating system selected from the group consisting of an operating system based on Windows and an operating system based on Unix.

5. The computer system of claim 2, wherein the computer hardware further comprises:
    computer hardware selected from the group consisting of Unix compatible computer hardware, Apple compatible computer hardware, and IBM compatible computer hardware.

6. The computer system of claim 2, wherein the native system services further comprise one or more native system services selected from the group consisting of thread services;

task services;

virtual memory services;

interprocess communication (IPC) services;

synchronization services;

scheduling services;

fault services;

processor and processor set services;

port services;

security services;

file system services; and graphical user interface (GUI) services.

7. A method for running object-oriented applications, comprising:

specifying a computer platform including a computer hardware and an operating system executing on said computer hardware;

providing an object-oriented interface specifying object-oriented classes each containing one or more methods, on the computer platform, the interface implemented on a plurality of computer platforms including different combinations of computer hardware and operating systems, the interface used by object-oriented applications to instantiate objects from the classes and invoke the object oriented methods;

providing a procedural program logic code, specific to the operating system, compiled for use on the computer hardware and responsive to the object-oriented interface to provide native system services from the computer platform;

determining if object-oriented methods to be invoked during runtime execution are not present in executable program memory in the computer hardware; and loading object-oriented methods into the executable program memory determined to not be present in the executable program memory prior to their runtime execution.

8. The method of claim 7, wherein the step of loading object-oriented method further comprises the step of:

loading related portions of the procedural program logic code determined to not be present in the executable program memory prior to their runtime execution.

9. The method of claim 8, further comprising the step of: designating which object-oriented methods request native system services.

10. The method of claim 8, wherein the step of executing an operating system on computer hardware further comprises the step of:

executing an operating system selected from the group consisting of an operating system based on Windows and an operating system based on Unix.

11. The method of claim 8, wherein the step of executing an operating system on computer hardware further comprises the step of:

executing the operating system on computer hardware selected from the group consisting of Unix compatible computer hardware, Apple compatible computer hardware, and IBM compatible computer hardware.

12. The method of claim 8 wherein the step of providing a procedural program logic code, specific to an operating system, compiled for use on computer hardware and responsive to an object-oriented interface for providing native system services from a computer platform further comprises:

providing one or more native system services selected from the group consisting of thread services;

task services;

virtual memory services;

interprocess communication (IPC) services;

synchronization services;

scheduling services;

fault services;

processor and processor set services;

port services;

security services;

file system services; and graphical user interface (GUI) services.

* * * * *